United States Patent
Chrisop et al.

(10) Patent No.: US 8,156,424 B2
(45) Date of Patent: Apr. 10, 2012

(54) METHODS AND SYSTEMS FOR IMAGING DEVICE DYNAMIC DOCUMENT CREATION AND ORGANIZATION

(75) Inventors: Roy K. Chrisop, Camas, WA (US); Tanna Marie Richardson, Happy Valley, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 956 days.

(21) Appl. No.: 11/232,827

(22) Filed: Sep. 22, 2005

(65) Prior Publication Data

US 2006/0103588 A1 May 18, 2006

Related U.S. Application Data

(63) Continuation-in-part of application No. 10/962,248, filed on Oct. 8, 2004, and a continuation-in-part of application No. 10/961,793, filed on Oct. 8, 2004, and a continuation-in-part of application No. 10/961,911, filed on Oct. 8, 2004, and a continuation-in-part of application No. 10/961,594, filed on Oct. 8, 2004, and a continuation-in-part of application No. 10/962,103, filed on Oct. 8, 2004.

(60) Provisional application No. 60/704,066, filed on Jul. 28, 2005.

(51) Int. Cl.
*G06F 17/00* (2006.01)
(52) U.S. Cl. ....... 715/234; 715/760; 715/273; 358/1.15; 345/2.1
(58) Field of Classification Search ............. 715/200, 715/255–256, 264–265, 234, 239
See application file for complete search history.

(56) References Cited

U.S. PATENT DOCUMENTS

| | | | |
|---|---|---|---|
| 5,085,587 | A | 2/1992 | DesForges et al. |
| 5,228,100 | A | 7/1993 | Takeda et al. |
| 5,323,393 | A | 6/1994 | Barrett et al. |
| 5,365,494 | A | 11/1994 | Lynch |
| 5,410,646 | A | 4/1995 | Tondevoid et al. |
| 5,504,589 | A | 4/1996 | Montague et al. |
| 5,513,112 | A | 4/1996 | Herring et al. |
| 5,542,031 | A | 7/1996 | Douglass et al. |

(Continued)

FOREIGN PATENT DOCUMENTS

JP 09160441 12/1995

(Continued)

OTHER PUBLICATIONS

U.S. Appl. No. 10/961,911—Office Action dated Apr. 16, 2008.

(Continued)

*Primary Examiner* — Doug Hutton, Jr.
*Assistant Examiner* — Benjamin Smith
(74) *Attorney, Agent, or Firm* — Krieger Intellectual Property, Inc.; Scott C. Krieger

(57) ABSTRACT

Aspects of the present invention relate to systems, methods and devices for imaging device dynamic document creation and organization. Some aspects relate to imaging device dynamic document creation and organization, wherein a document format, a dynamic field structure and document static content are selected on an imaging device user interface and combined to form a dynamic document on the imaging device. Some aspects of the present invention relate to imaging device dynamic document creation and organization, wherein dynamic document menu options are sent to an imaging device from a remote computing device.

10 Claims, 19 Drawing Sheets

U.S. PATENT DOCUMENTS

| | | | |
|---|---|---|---|
| 5,586,260 A | 12/1996 | Hu |
| 5,659,845 A | 8/1997 | Krist et al. |
| 5,671,412 A | 9/1997 | Christiano |
| 5,699,493 A | 12/1997 | Davidson et al. |
| 5,699,494 A | 12/1997 | Colbert et al. |
| 5,717,439 A | 2/1998 | Levine et al. |
| 5,726,883 A | 3/1998 | Levine et al. |
| 5,727,082 A | 3/1998 | Sugishima |
| 5,727,135 A | 3/1998 | Webb et al. |
| 5,745,883 A | 4/1998 | Krist et al. |
| 5,760,775 A | 6/1998 | Sklut et al. |
| 5,774,678 A | 6/1998 | Motoyama |
| 5,791,790 A | 8/1998 | Bender et al. |
| 5,796,934 A | 8/1998 | Bhanot et al. |
| 5,799,206 A | 8/1998 | Kitagawa et al. |
| 5,799,289 A | 8/1998 | Fukushima et al. |
| 5,812,818 A | 9/1998 | Adler et al. |
| 5,832,264 A | 11/1998 | Hart et al. |
| 5,848,231 A | 12/1998 | Teitelbaum et al. |
| 5,877,776 A | 3/1999 | Beaman et al. |
| 5,944,824 A | 8/1999 | He |
| 5,956,487 A | 9/1999 | Venkatraman et al. |
| 5,956,698 A | 9/1999 | Lacheze et al. |
| 5,968,127 A | 10/1999 | Kawabe et al. |
| 5,993,088 A | 11/1999 | Nogay et al. |
| 5,995,553 A | 11/1999 | Crandall et al. |
| 5,999,708 A | 12/1999 | Kajita |
| 6,042,384 A | 3/2000 | Loiacono |
| 6,044,382 A | 3/2000 | Martino |
| 6,069,706 A | 5/2000 | Kajita |
| 6,075,860 A | 6/2000 | Ketcham |
| 6,115,132 A | 9/2000 | Nakatsuma et al. |
| 6,118,546 A | 9/2000 | Sanchez et al. |
| 6,128,731 A | 10/2000 | Zarrin et al. |
| 6,141,662 A | 10/2000 | Jeyachandran |
| 6,148,346 A | 11/2000 | Hanson |
| 6,161,139 A | 12/2000 | Win et al. |
| 6,178,308 B1 | 1/2001 | Bobrow et al. |
| 6,199,080 B1 | 3/2001 | Nielsen |
| 6,213,652 B1 | 4/2001 | Suzuki et al. |
| 6,216,113 B1 | 4/2001 | Aikens et al. |
| 6,233,409 B1 | 5/2001 | Haines et al. |
| 6,240,456 B1 | 5/2001 | Teng et al. |
| 6,246,487 B1 | 6/2001 | Kobayashi et al. |
| 6,292,267 B1 | 9/2001 | Mori et al. |
| 6,301,016 B1 | 10/2001 | Matsueda et al. |
| 6,307,640 B1 | 10/2001 | Motegi |
| 6,311,040 B1 | 10/2001 | Kucinski et al. |
| 6,353,878 B1 | 3/2002 | Dunham |
| 6,369,905 B1 | 4/2002 | Mitsuhashi et al. |
| 6,407,820 B1 | 6/2002 | Hansen et al. |
| 6,426,798 B1 | 7/2002 | Yeung |
| 6,433,883 B1 | 8/2002 | Kajita |
| 6,438,589 B1 | 8/2002 | Iwata |
| 6,462,756 B1 | 10/2002 | Hansen et al. |
| 6,476,926 B1 | 11/2002 | Yano et al. |
| 6,490,601 B1 | 12/2002 | Markus et al. |
| 6,509,974 B1 | 1/2003 | Hansen |
| 6,510,466 B1 | 1/2003 | Cox et al. |
| 6,516,157 B1 | 2/2003 | Maruta et al. |
| 6,526,258 B2 | 2/2003 | Bejar et al. |
| 6,567,179 B1 | 5/2003 | Sato et al. |
| 6,590,589 B1 | 7/2003 | Sluiman et al. |
| 6,590,673 B2 | 7/2003 | Kadowaki |
| 6,592,275 B1 | 7/2003 | Aihara et al. |
| 6,597,469 B1 | 7/2003 | Kuroyanagi |
| 6,604,157 B1 | 8/2003 | Brusky et al. |
| 6,621,422 B2 | 9/2003 | Rubenstein |
| 6,636,929 B1 | 10/2003 | Frantz et al. |
| 6,643,650 B1 | 11/2003 | Slaughter et al. |
| 6,652,169 B2 | 11/2003 | Parry |
| 6,685,637 B1 | 2/2004 | Rom |
| 6,707,466 B1 | 3/2004 | Van Sickle et al. |
| 6,721,286 B1 | 4/2004 | Williams et al. |
| 6,735,773 B1 | 5/2004 | Trinh et al. |
| 6,749,434 B2 | 6/2004 | Stuppy |
| 6,772,945 B2 | 8/2004 | Mahoney et al. |
| 6,775,729 B1 | 8/2004 | Matsuo et al. |
| 6,823,225 B1 | 11/2004 | Sass |
| 6,826,727 B1 * | 11/2004 | Mohr et al. ................... 715/235 |
| 6,836,623 B2 | 12/2004 | Imai |
| 6,836,845 B1 | 12/2004 | Lennie et al. |
| 6,850,252 B1 | 2/2005 | Hoffberg |
| 6,854,839 B2 | 2/2005 | Collier et al. |
| 6,862,110 B2 | 3/2005 | Harrington |
| 6,862,583 B1 | 3/2005 | Mazzagatte et al. |
| 6,873,429 B2 | 3/2005 | Matsuura |
| 6,874,010 B1 | 3/2005 | Sargent |
| 6,904,412 B1 | 6/2005 | Broadbent et al. |
| 6,915,525 B2 | 7/2005 | Ozawa |
| 6,934,706 B1 | 8/2005 | Mancuso et al. |
| 6,934,740 B1 | 8/2005 | Lawande et al. |
| 6,940,532 B1 | 9/2005 | Fukui et al. |
| 6,948,175 B1 | 9/2005 | Fong et al. |
| 6,951,303 B2 | 10/2005 | Peterson et al. |
| 6,975,820 B2 | 12/2005 | Wong |
| 6,999,987 B1 * | 2/2006 | Billingsley et al. ........... 709/203 |
| 7,003,723 B1 | 2/2006 | Kremer et al. |
| 7,007,026 B2 * | 2/2006 | Wilkinson et al. .................. 1/1 |
| 7,012,706 B1 | 3/2006 | Hansen |
| 7,013,289 B2 * | 3/2006 | Horn et al. ................. 705/14.51 |
| 7,019,753 B2 | 3/2006 | Rappaport et al. |
| 7,034,958 B1 | 4/2006 | Hara |
| 7,072,057 B1 | 7/2006 | Hansen |
| 7,079,143 B2 | 7/2006 | Gilbert |
| 7,095,513 B2 | 8/2006 | Stringham |
| 7,107,615 B2 | 9/2006 | Cossel et al. |
| 7,124,097 B2 | 10/2006 | Claremont et al. |
| 7,126,717 B2 | 10/2006 | Jeyachandran et al. |
| 7,127,700 B2 | 10/2006 | Large |
| 7,136,909 B2 | 11/2006 | Balasuriya |
| 7,136,941 B2 | 11/2006 | Nguyen et al. |
| 7,143,364 B1 | 11/2006 | Tam |
| 7,145,673 B1 | 12/2006 | Lin |
| 7,145,686 B2 * | 12/2006 | Simpson et al. ............. 358/1.18 |
| 7,149,697 B2 | 12/2006 | Zerza et al. |
| 7,149,964 B1 * | 12/2006 | Cottrille et al. ............... 715/234 |
| 7,162,103 B2 | 1/2007 | Meunier et al. |
| 7,170,618 B2 | 1/2007 | Fujitani et al. |
| 7,174,056 B2 * | 2/2007 | Silverbrook et al. ......... 382/312 |
| 7,177,814 B2 | 2/2007 | Gong et al. |
| 7,181,017 B1 | 2/2007 | Nagel et al. |
| 7,181,442 B2 | 2/2007 | Yeh et al. |
| 7,185,078 B2 | 2/2007 | Pleyer et al. |
| 7,188,125 B1 | 3/2007 | Karr |
| 7,188,181 B1 | 3/2007 | Squier et al. |
| 7,191,391 B2 | 3/2007 | Takashima |
| 7,197,615 B2 | 3/2007 | Arakawa et al. |
| 7,203,699 B2 | 4/2007 | Bellamy |
| 7,212,301 B2 | 5/2007 | Treibach-Heck et al. |
| 7,216,347 B1 | 5/2007 | Harrison et al. |
| 7,233,929 B1 | 6/2007 | Lingle et al. |
| 7,239,409 B2 | 7/2007 | Parry |
| 7,249,100 B2 * | 7/2007 | Murto et al. ..................... 705/50 |
| RE39,808 E | 9/2007 | Motegi |
| 7,268,896 B2 * | 9/2007 | Bellagamba et al. ........ 358/1.12 |
| 7,272,269 B2 | 9/2007 | Tojo et al. |
| 7,275,044 B2 | 9/2007 | Chauvin et al. |
| 7,284,061 B2 | 10/2007 | Matsubayashi et al. |
| 7,284,199 B2 * | 10/2007 | Parasnis et al. ............... 715/201 |
| 7,293,034 B2 | 11/2007 | Paya et al. |
| 7,296,221 B1 | 11/2007 | Treibach-Heck et al. |
| 7,301,658 B2 | 11/2007 | Henry |
| 7,305,616 B1 * | 12/2007 | Nelson et al. ................. 715/235 |
| 7,321,440 B2 | 1/2008 | Kimura |
| 7,325,196 B1 * | 1/2008 | Covington et al. ........... 715/251 |
| 7,327,478 B2 | 2/2008 | Matsuda |
| 7,328,245 B1 * | 2/2008 | Hull et al. ..................... 709/206 |
| 7,343,551 B1 | 3/2008 | Bourdev |
| 7,349,949 B1 | 3/2008 | Connor et al. |
| 7,363,586 B1 | 4/2008 | Briggs et al. |
| 7,404,204 B2 | 7/2008 | Davenport et al. |
| 7,406,660 B1 | 7/2008 | Sikchi et al. |
| 7,441,188 B1 | 10/2008 | Russell et al. |
| 7,444,519 B2 | 10/2008 | Laferriere et al. |
| 7,451,117 B2 | 11/2008 | Cozianu et al. |
| 7,451,392 B1 | 11/2008 | Chalecki et al. |

| | | |
|---|---|---|
| 7,454,623 B2 | 11/2008 | Hardt |
| 7,467,211 B1 | 12/2008 | Herman et al. |
| 7,468,805 B2 * | 12/2008 | Lo et al. .................. 358/1.18 |
| 7,496,837 B1 | 2/2009 | Larcheveque et al. |
| 7,500,178 B1 * | 3/2009 | O'Donnell .................. 715/221 |
| 7,508,535 B2 | 3/2009 | Hart et al. |
| 7,509,649 B2 | 3/2009 | Shenfield |
| 7,523,401 B1 * | 4/2009 | Aldridge ................... 715/760 |
| 7,545,528 B2 | 6/2009 | Takabayashi et al. |
| 7,548,334 B2 * | 6/2009 | Lo et al. ................... 358/1.15 |
| 7,552,265 B2 | 6/2009 | Newman et al. |
| 7,565,554 B2 | 7/2009 | Joosten et al. |
| 7,567,360 B2 * | 7/2009 | Takahashi et al. .......... 358/1.15 |
| 7,573,593 B2 * | 8/2009 | Hart et al. ................. 358/1.15 |
| 7,657,557 B2 | 2/2010 | Super |
| 7,729,363 B2 | 6/2010 | Shenfield et al. |
| 7,904,600 B2 * | 3/2011 | Madril et al. ............... 709/250 |
| 8,060,556 B2 * | 11/2011 | Krane et al. ................ 709/203 |
| 2001/0021945 A1 | 9/2001 | Matsuura |
| 2001/0027527 A1 | 10/2001 | Khidekel et al. |
| 2001/0028808 A1 | 10/2001 | Nomura et al. |
| 2001/0038462 A1 | 11/2001 | Teeuwen et al. |
| 2001/0039614 A1 | 11/2001 | Hellberg et al. |
| 2001/0044787 A1 | 11/2001 | Shwartz et al. |
| 2002/0016921 A1 | 2/2002 | Olsen et al. |
| 2002/0029256 A1 | 3/2002 | Zintel et al. |
| 2002/0032745 A1 | 3/2002 | Honda |
| 2002/0049786 A1 | 4/2002 | Bibliowicz et al. |
| 2002/0052916 A1 | 5/2002 | Kloba et al. |
| 2002/0055984 A1 | 5/2002 | Chang et al. |
| 2002/0059265 A1 | 5/2002 | Valorose, III |
| 2002/0073148 A1 | 6/2002 | Haines et al. |
| 2002/0080381 A1 | 6/2002 | Haines |
| 2002/0089691 A1 | 7/2002 | Fertlitsch et al. |
| 2002/0093676 A1 | 7/2002 | Parry |
| 2002/0098027 A1 | 7/2002 | Koike et al. |
| 2002/0099796 A1 | 7/2002 | Chou |
| 2002/0103827 A1 | 8/2002 | Sesek |
| 2002/0105664 A1 | 8/2002 | Inoue et al. |
| 2002/0107939 A1 | 8/2002 | Ford et al. |
| 2002/0109718 A1 | 8/2002 | Mansour et al. |
| 2002/0112037 A1 | 8/2002 | Koss |
| 2002/0120792 A1 | 8/2002 | Blair |
| 2002/0138279 A1 | 9/2002 | Al-Kazily et al. |
| 2002/0138476 A1 | 9/2002 | Suwa et al. |
| 2002/0138666 A1 | 9/2002 | Fujisawa |
| 2002/0145627 A1 | 10/2002 | Whitmarsh et al. |
| 2002/0147858 A1 | 10/2002 | Motoyama et al. |
| 2002/0152183 A1 | 10/2002 | Soares et al. |
| 2002/0152235 A1 | 10/2002 | Motoyama et al. |
| 2002/0152302 A1 | 10/2002 | Motoyama et al. |
| 2002/0156795 A1 | 10/2002 | Edwards et al. |
| 2002/0156846 A1 | 10/2002 | Rawat et al. |
| 2002/0171857 A1 | 11/2002 | Hisatomi et al. |
| 2002/0194180 A1 | 12/2002 | Alsop et al. |
| 2002/0194350 A1 | 12/2002 | Lu et al. |
| 2003/0002074 A1 | 1/2003 | Miyano |
| 2003/0007170 A1 | 1/2003 | Kajita et al. |
| 2003/0011633 A1 | 1/2003 | Conley et al. |
| 2003/0011640 A1 | 1/2003 | Green et al. |
| 2003/0014515 A1 | 1/2003 | Motoyama et al. |
| 2003/0014529 A1 | 1/2003 | Simpson et al. |
| 2003/0033369 A1 | 2/2003 | Bernhard |
| 2003/0035133 A1 | 2/2003 | Berkema et al. |
| 2003/0038965 A1 | 2/2003 | Simpson et al. |
| 2003/0043205 A1 | 3/2003 | Hill |
| 2003/0043396 A1 | 3/2003 | Klosterman et al. |
| 2003/0043405 A1 | 3/2003 | Hill |
| 2003/0048470 A1 | 3/2003 | Garcia |
| 2003/0048473 A1 | 3/2003 | Rosen |
| 2003/0049037 A1 | 3/2003 | Sadowara et al. |
| 2003/0053123 A1 | 3/2003 | Wu et al. |
| 2003/0063313 A1 | 4/2003 | Ito |
| 2003/0065766 A1 | 4/2003 | Parry |
| 2003/0065791 A1 | 4/2003 | Garg et al. |
| 2003/0074267 A1 | 4/2003 | Acharya et al. |
| 2003/0074312 A1 | 4/2003 | White |
| 2003/0081240 A1 | 5/2003 | Soto et al. |
| 2003/0084114 A1 * | 5/2003 | Simpson et al. ............... 709/216 |
| 2003/0084302 A1 | 5/2003 | de Jong et al. |
| 2003/0088642 A1 | 5/2003 | Price et al. |
| 2003/0123112 A1 | 7/2003 | Kajita et al. |
| 2003/0131110 A1 | 7/2003 | Chang et al. |
| 2003/0142351 A1 | 7/2003 | Sakura |
| 2003/0164987 A1 | 9/2003 | Enomoto et al. |
| 2003/0167336 A1 | 9/2003 | Iwamoto et al. |
| 2003/0174356 A1 | 9/2003 | Cherry et al. |
| 2003/0182632 A1 * | 9/2003 | Murdock et al. ............... 715/536 |
| 2003/0184552 A1 | 10/2003 | Chadha |
| 2003/0184590 A1 | 10/2003 | Will |
| 2003/0184782 A1 | 10/2003 | Perkins et al. |
| 2003/0187922 A1 | 10/2003 | Ohara |
| 2003/0188193 A1 | 10/2003 | Venkataramappa |
| 2003/0197883 A1 | 10/2003 | Lay et al. |
| 2003/0225796 A1 | 12/2003 | Matsubara |
| 2003/0225829 A1 | 12/2003 | Pena et al. |
| 2003/0225894 A1 | 12/2003 | Ito |
| 2003/0231196 A1 | 12/2003 | Keohane et al. |
| 2003/0233437 A1 | 12/2003 | Kitada et al. |
| 2004/0003341 A1 | 1/2004 | alSafadi et al. |
| 2004/0008363 A1 | 1/2004 | Suzuki et al. |
| 2004/0012628 A1 | 1/2004 | Kropf et al. |
| 2004/0012644 A1 | 1/2004 | Allen et al. |
| 2004/0019705 A1 | 1/2004 | Ogura |
| 2004/0030693 A1 | 2/2004 | Toda |
| 2004/0034786 A1 | 2/2004 | Okamoto et al. |
| 2004/0034807 A1 | 2/2004 | Rostowfske |
| 2004/0039990 A1 | 2/2004 | Bakar et al. |
| 2004/0044779 A1 | 3/2004 | Lambert |
| 2004/0054573 A1 * | 3/2004 | Shah et al. .................... 705/14 |
| 2004/0061729 A1 | 4/2004 | Green |
| 2004/0064759 A1 | 4/2004 | McGuire et al. |
| 2004/0068693 A1 | 4/2004 | Rawat et al. |
| 2004/0070606 A1 | 4/2004 | Yang et al. |
| 2004/0080511 A1 | 4/2004 | Gilbert |
| 2004/0080771 A1 | 4/2004 | Mihira et al. |
| 2004/0080778 A1 | 4/2004 | Ito et al. |
| 2004/0093515 A1 | 5/2004 | Reeves, Jr. |
| 2004/0098165 A1 | 5/2004 | Butikofer |
| 2004/0098316 A1 | 5/2004 | Philippe et al. |
| 2004/0098595 A1 | 5/2004 | Apperle et al. |
| 2004/0105104 A1 | 6/2004 | Ishikawa et al. |
| 2004/0105122 A1 | 6/2004 | Schaeffer |
| 2004/0109028 A1 | 6/2004 | Stern et al. |
| 2004/0111670 A1 | 6/2004 | Sasakuma et al. |
| 2004/0113941 A1 | 6/2004 | Sliwa et al. |
| 2004/0117358 A1 | 6/2004 | von Kaenel et al. |
| 2004/0117784 A1 | 6/2004 | Endoh |
| 2004/0125403 A1 | 7/2004 | Furst et al. |
| 2004/0128349 A1 | 7/2004 | Maruyama |
| 2004/0130744 A1 | 7/2004 | Wu et al. |
| 2004/0130749 A1 | 7/2004 | Aoki |
| 2004/0133525 A1 | 7/2004 | Singh et al. |
| 2004/0150663 A1 | 8/2004 | Kim |
| 2004/0158471 A1 | 8/2004 | Davis et al. |
| 2004/0161257 A1 | 8/2004 | Ishihara |
| 2004/0162076 A1 | 8/2004 | Chowdry et al. |
| 2004/0165209 A1 | 8/2004 | Aoki et al. |
| 2004/0169881 A1 | 9/2004 | Sato |
| 2004/0179229 A1 | 9/2004 | Laughlin |
| 2004/0181747 A1 * | 9/2004 | Hull et al. .................... 715/500.1 |
| 2004/0187018 A1 | 9/2004 | Owen et al. |
| 2004/0190057 A1 * | 9/2004 | Takahashi et al. ............ 358/1.15 |
| 2004/0193678 A1 | 9/2004 | Trufinescu et al. |
| 2004/0199538 A1 | 10/2004 | Matsuda et al. |
| 2004/0203358 A1 | 10/2004 | Anderson |
| 2004/0205118 A1 * | 10/2004 | Yu ............................ 709/203 |
| 2004/0205533 A1 | 10/2004 | Lopata et al. |
| 2004/0205620 A1 | 10/2004 | Nishikiori et al. |
| 2004/0212823 A1 | 10/2004 | Chavers et al. |
| 2004/0215671 A1 * | 10/2004 | Hyakutake et al. ............ 707/203 |
| 2004/0221231 A1 | 11/2004 | Madril et al. |
| 2004/0223778 A1 | 11/2004 | Zwiefelhofer |
| 2004/0226993 A1 | 11/2004 | Fulcher et al. |
| 2004/0227968 A1 | 11/2004 | Nakamura et al. |
| 2004/0230500 A1 | 11/2004 | Imago |
| 2004/0236862 A1 | 11/2004 | Ito |
| 2004/0254955 A1 | 12/2004 | Reese et al. |

| | | | |
|---|---|---|---|
| 2004/0255263 A1 | 12/2004 | Ando | |
| 2004/0261010 A1* | 12/2004 | Matsuishi ............... 715/501.1 | |
| 2004/0268229 A1 | 12/2004 | Paoli et al. | |
| 2004/0268306 A1* | 12/2004 | Cheng et al. ............... 717/114 | |
| 2005/0005094 A1 | 1/2005 | Jamieson et al. | |
| 2005/0015472 A1 | 1/2005 | Catania et al. | |
| 2005/0015585 A1 | 1/2005 | Kurose | |
| 2005/0026593 A1 | 2/2005 | Anderson et al. | |
| 2005/0028086 A1 | 2/2005 | Itavaara et al. | |
| 2005/0044248 A1 | 2/2005 | Mihira et al. | |
| 2005/0055475 A1 | 3/2005 | MacKay et al. | |
| 2005/0057560 A1 | 3/2005 | Bibr et al. | |
| 2005/0060046 A1 | 3/2005 | Ito et al. | |
| 2005/0060564 A1 | 3/2005 | Murakami et al. | |
| 2005/0063010 A1* | 3/2005 | Giannetti ............... 358/1.18 | |
| 2005/0068581 A1 | 3/2005 | Hull et al. | |
| 2005/0071507 A1 | 3/2005 | Ferlitsch | |
| 2005/0071746 A1* | 3/2005 | Hart et al. ............... 715/500.1 | |
| 2005/0080649 A1 | 4/2005 | Alvarez et al. | |
| 2005/0091087 A1 | 4/2005 | Smith et al. | |
| 2005/0091490 A1 | 4/2005 | Ogura | |
| 2005/0097458 A1 | 5/2005 | Wilson | |
| 2005/0108353 A1 | 5/2005 | Yamamoto | |
| 2005/0114267 A1 | 5/2005 | Miwa et al. | |
| 2005/0114658 A1 | 5/2005 | Dye et al. | |
| 2005/0114766 A1 | 5/2005 | Yamamoto | |
| 2005/0119955 A1 | 6/2005 | Dang et al. | |
| 2005/0129423 A1 | 6/2005 | Lester et al. | |
| 2005/0149576 A1 | 7/2005 | Marmaros et al. | |
| 2005/0152334 A1 | 7/2005 | Okamoto et al. | |
| 2005/0185217 A1 | 8/2005 | Nishizawa et al. | |
| 2005/0195221 A1 | 9/2005 | Berger et al. | |
| 2005/0210399 A1 | 9/2005 | Filner et al. | |
| 2005/0223413 A1 | 10/2005 | Duggan et al. | |
| 2005/0231747 A1 | 10/2005 | Bledsoe et al. | |
| 2005/0231755 A1 | 10/2005 | Araumi et al. | |
| 2005/0246428 A1 | 11/2005 | Araumi | |
| 2005/0257134 A1 | 11/2005 | Goodman et al. | |
| 2005/0257148 A1* | 11/2005 | Goodman et al. ............ 715/534 | |
| 2005/0265744 A1 | 12/2005 | Uruta | |
| 2006/0007480 A1 | 1/2006 | Yokokura | |
| 2006/0010180 A1 | 1/2006 | Kawamura et al. | |
| 2006/0015734 A1 | 1/2006 | Atobe | |
| 2006/0028397 A1 | 2/2006 | O'Rourke | |
| 2006/0031411 A1 | 2/2006 | Gimson et al. | |
| 2006/0038004 A1 | 2/2006 | Rielly et al. | |
| 2006/0041443 A1* | 2/2006 | Horvath ............... 705/1 | |
| 2006/0045386 A1 | 3/2006 | Fukuoka et al. | |
| 2006/0056873 A1 | 3/2006 | Kimura | |
| 2006/0059434 A1 | 3/2006 | Boss et al. | |
| 2006/0064647 A1 | 3/2006 | Tapuska et al. | |
| 2006/0077423 A1 | 4/2006 | Mathieson et al. | |
| 2006/0077432 A1 | 4/2006 | Lovat et al. | |
| 2006/0077439 A1 | 4/2006 | Yamamura et al. | |
| 2006/0077444 A1 | 4/2006 | Lum et al. | |
| 2006/0085835 A1 | 4/2006 | Istvan et al. | |
| 2006/0112123 A1 | 5/2006 | Clark et al. | |
| 2006/0154227 A1 | 7/2006 | Rossi et al. | |
| 2006/0162076 A1 | 7/2006 | Bartlett et al. | |
| 2006/0198653 A1 | 9/2006 | Plewnia et al. | |
| 2006/0221941 A1* | 10/2006 | Kishinsky et al. ............ 370/352 | |
| 2006/0224405 A1 | 10/2006 | White et al. | |
| 2006/0235742 A1 | 10/2006 | Castellanos et al. | |
| 2006/0279475 A1 | 12/2006 | Lum et al. | |
| 2007/0022180 A1 | 1/2007 | Cocotis et al. | |
| 2007/0041035 A1* | 2/2007 | Sembower et al. ............ 358/1.15 | |
| 2007/0094103 A1 | 4/2007 | Hyakutake et al. | |
| 2007/0173266 A1 | 7/2007 | Barnes, Jr. | |
| 2007/0174894 A1 | 7/2007 | Matsunaga | |
| 2007/0186150 A1 | 8/2007 | Rao et al. | |
| 2007/0291293 A1* | 12/2007 | Bellagamba et al. ........ 358/1.12 | |
| 2008/0072162 A1 | 3/2008 | Dauerer et al. | |

FOREIGN PATENT DOCUMENTS

| | | |
|---|---|---|
| JP | 09293036 | 11/1997 |
| JP | 09330190 | 12/1997 |
| JP | 10013695 | 1/1998 |
| JP | 10154190 A | 6/1998 |
| JP | 10240490 | 9/1998 |
| JP | 10269184 | 10/1998 |
| JP | 2000112691 | 4/2000 |
| JP | 2000174949 | 6/2000 |
| JP | 2000207108 | 7/2000 |
| JP | 2002259071 | 2/2001 |
| JP | 2001268296 | 9/2001 |
| JP | 200284383 | 3/2002 |
| JP | 2002140195 | 5/2002 |
| JP | 2002171380 | 6/2002 |
| JP | 2002175195 | 6/2002 |
| JP | 2002221877 | 8/2002 |
| JP | 2002236830 | 8/2002 |
| JP | 2002298049 A | 10/2002 |
| JP | 2002312148 | 10/2002 |
| JP | 2002324049 | 11/2002 |
| JP | 2002351644 | 12/2002 |
| JP | 2003022258 | 1/2003 |
| JP | 2003157155 A | 5/2003 |
| JP | 2003178023 | 6/2003 |
| JP | 2003196554 A | 7/2003 |
| JP | 2003198792 | 7/2003 |
| JP | 2003208484 | 7/2003 |
| JP | 2003209644 | 7/2003 |
| JP | 2003216368 | 7/2003 |
| JP | 2003216395 A | 7/2003 |
| JP | 2003223299 | 8/2003 |
| JP | 2003281227 | 10/2003 |
| JP | 2003288179 | 10/2003 |
| JP | 2003308195 | 10/2003 |
| JP | 200430448 | 1/2004 |
| JP | 2004074530 | 3/2004 |
| JP | 2004088561 | 3/2004 |
| JP | 2004094313 | 3/2004 |
| JP | 2004128561 | 4/2004 |
| JP | 2004118549 | 5/2004 |
| JP | 2004164157 A | 6/2004 |
| JP | 2004185396 | 7/2004 |
| JP | 2004213356 | 7/2004 |
| JP | 2004215309 | 7/2004 |
| JP | 2004222247 | 8/2004 |
| JP | 2004228686 | 8/2004 |
| JP | 2004228687 | 8/2004 |
| JP | 2004246771 | 9/2004 |
| JP | 2004310516 | 11/2004 |
| JP | 2004276271 | 12/2004 |
| JP | 2004358800 | 12/2004 |
| JP | 2005014591 | 1/2005 |
| JP | 2005059496 | 3/2005 |
| JP | 2005070979 | 3/2005 |
| JP | 2005078278 | 3/2005 |
| JP | 2005084891 | 3/2005 |
| JP | 2005115543 | 4/2005 |
| JP | 2005004243 | 6/2005 |
| JP | 2005209059 | 8/2005 |
| JP | 2005219440 A | 8/2005 |
| JP | 2005235034 A | 9/2005 |
| JP | 2005269250 | 9/2005 |
| JP | 2006053905 | 2/2006 |
| JP | 2006140898 | 6/2006 |
| WO | WO0118754 A1 | 3/2001 |
| WO | WO01/33381 | 5/2001 |
| WO | WO0198864 | 12/2001 |

OTHER PUBLICATIONS

U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.
U.S. Appl. No. 11/193,147—Office Action dated Dec. 6, 2007.
U.S. Appl. No. 11/193,147—Office Action dated Jul. 23, 2007.
U.S. Appl. No. 11/193,147—Office Action dated Feb. 9, 2007.
Canon USA, Inc.; MEAP Multifunctional Embedded Application Platform; Aug. 2004; http://developersupport.canon.com/Web_MEAP_Presentation.pdf.
Canon USA, Inc.; MEAP: FAQ; accessed on Jul. 2004, pub. date unknown; http://developersupport.canon.com/MEAP.htm.

Xerox, Inc.; Xerox FreeFlow digital workflow collection; 2003; http://www.xerox.com/downloads/usa/en/s/solutions_digital_workflow_whitepaper_sdk.pdf.
Ricoh Company, Ltd.; Ricoh's Medium-Term Management Plan; Mar. 19, 2002; http://www.ricoh.com/IR/data/pre/pdf/ir_pre2002.pdf.
Ricoh Company, Ltd.; White Paper: Embedded Software Architecture SDK; Jun. 25, 2003; http://www.ricoh-usa.com/products/concept/esa.asp?catname=ESA.
Hewlett-Packard Company; JetCAPS Scan2Folder; 2003; http://www.jetcaps.se/resources/datasheets/ds_scan2folder.pdf.
Hewlett-Packard Company; JetCAPS chai applications; Dec. 9, 2002; http://www.stethos.com/chai/data/d_us_chai.pdf.
Ratha, N.K., Connell, J.H., Bolle, R.M. "Enhancing security and privacy in biometrics-based authentication systems". IBM Systems Journal 40(3), pp. 614-634 (2001).
U.S. Appl. No. 10/962,248—Final Office Action dated Jun. 10, 2009.
U.S. Appl. No. 10/962,248—Non-Final Office Action dated Jan. 29, 2010.
U.S. Appl. No. 11/232,588—Non-Final Office Action dated Apr. 1, 2009.
U.S. Appl. No. 11/232,588—Final Office Action dated Nov. 27, 2009.
U.S. Appl. No. 10/961,793—Non- Final Office Action dated Jun. 24, 2009.
U.S. Appl. No. 10/961,793—Final Office Action dated Feb. 4, 2010.
U.S. Appl. No. 10/961,911—Non-Final Office Action dated Jun. 8, 2009.
U.S. Appl. No. 10/961,911—Non-Final Office Action dated Feb. 3, 2010.
U.S. Appl. No. 10/962,103—Non-Final Office Action dated Aug. 14, 2009.
U.S. Appl. No. 11/073,055—Non-Final Office Action dated Jun. 19, 2009.
U.S. Appl. No. 11/073,055—Final Office Action dated Feb. 18, 2010.
U.S. Appl. No. 11/233,202—Non-Final Office Action dated Jun. 9, 2009.
U.S. Appl. No. 11/233,202—Final Office Action dated Jan. 15, 2010.
U.S. Appl. No. 11/233,201—Final Office Action dated Apr. 28, 2009.
U.S. Appl. No. 11/233,201—Non-Final Office Action dated Sep. 4, 2009.
U.S. Appl. No. 11/232,552—Final Office Action dated Jun. 24, 2009.
U.S. Appl. No. 11/232,552—Non-Final Office Action dated Dec. 24, 2009.
U.S. Appl. No. 11/233,270—Final Office Action dated Mar. 31, 2009.
U.S. Appl. No. 11/233,270—Final Office Action dated Nov. 27, 2009.
U.S. Appl. No. 11/465,699—Non-Final Office Action dated Sep. 17, 2008.
U.S. Appl. No. 11/465,699—Final Office Action dated Mar. 31, 2009.
U.S. Appl. No. 11/465,699—Final Office Action dated Nov. 27, 2009.
U.S. Appl. No. 11/465,722—Non-Final Office Action dated Dec. 24, 2009.
U.S. Appl. No. 11/241,501—Final Office Action dated May 13, 2009.
U.S. Appl. No. 11/241,501—Non-Final Office Action dated Feb. 9, 2010.
U.S. Appl. No. 11/241,497—Non-Final Office Action dated Oct. 6, 2009.
U.S. Appl. No. 11/241,011—Final Office Action dated Apr. 2, 2009.
U.S. Appl. No. 11/241,011—Non-Final Office Action dated Jan. 4, 2010.
U.S. Appl. No. 11/241,010—Final Office Action dated Mar. 20, 2009.
U.S. Appl. No. 11/241,071—Non-Final Office Action dated Aug. 19, 2009.
U.S. Appl. No. 11/241,447—Non-Final Office Action dated Jul. 22, 2009.
U.S. Appl. No. 11/241,498—Non-Final Office Action dated Dec. 10, 2009.
U.S. Appl. No. 11/240,039—Final Office Action dated Apr. 13, 2009.
U.S. Appl. No. 11/240,039—Non-Final Office Action dated Nov. 3, 2009.
U.S. Appl. No. 11/240,156—Non-Final Office Action dated Sep. 16, 2009.
U.S. Appl. No. 11/255,611—Notice of Allowance dated Aug. 10, 2009.
U.S. Appl. No. 11/256,479—Final Office Action dated Apr. 1, 2009.
U.S. Appl. No. 11/256,479—Non-Final Office Action dated Nov. 16, 2009.
U.S. Appl. No. 11/192,617—Non-Final Office Action dated Sep. 29, 2009.
U.S. Appl. No. 11/193,154—Non-Final Office Action dated Jun. 3, 2009.
U.S. Appl. No. 11/193,154—Final Office Action dated Dec. 7, 2009.
U.S. Appl. No. 11/192,630—Final Office Action dated Sep. 2, 2009.
U.S. Appl. No. 11/192,546—Final Office Action dated Jun. 30, 2009.
U.S. Appl. No. 11/192,546—Non-Final Office Action dated Nov. 24, 2009.
U.S. Appl. No. 11/193,077—Notice of Allowance dated Mar. 11, 2008.
U.S. Appl. No. 11/192,870—Non-Final Office Action dated Jul. 17, 2009.
U.S. Appl. No. 11/192,870—Final Office Action dated Jan. 4, 2010.
U.S. Appl. No. 11/192,865—Non-Final Office Action dated Aug. 20, 2009.
U.S. Appl. No. 11/192,836—Notice of Allowance dated Dec. 30, 2008.
U.S. Appl. No. 11/192,616—Non-Final Office Action dated Sep. 17, 2009.
U.S. Appl. No. 11/193,147—Notice of Allowance dated Dec. 30, 2008.
U.S. Appl. No. 11/192,868—Final Office Action dated Aug. 11, 2009.
U.S. Appl. No. 11/192,629—Final Office Action dated Jun. 26, 2009.
U.S. Appl. No. 11/192,629—Non-Final Office Action dated Jan. 15, 2010.
U.S. Appl. No. 11/193,151—Final Office Action dated Sep. 21, 2009.
U.S. Appl. No. 11/193,188—Final Office Action dated Aug. 5, 2009.
U.S. Appl. No. 11/192,824—Non-Final Office Action dated Sep. 18, 2009.
U.S. Appl. No. 11/193,140—Final Office Action dated May 18, 2009.
U.S. Appl. No. 11/193,140—Notice of Allowance dated Jan. 29, 2010.
U.S. Appl. No. 11/192,796—Non-Final Office Action dated Dec. 28, 2009.
U.S. Appl. No. 11/192,615—Non-Final Office Action dated Sep. 4, 2009.
U.S. Appl. No. 11/192,547—Final Office Action dated Jan. 15, 2010.
U.S. Appl. No. 11/192,467—Non-Final Office Action dated Nov. 13, 2009.
U.S. Appl. No. 11/255,333—Notice of Allowance dated Nov. 3, 2009.
U.S. Appl. No. 11/465,747—Non-Final Office Action dated Jun. 24, 2009.
U.S. Appl. No. 11/465,752—Non-Final Office Action dated Jun. 24, 2009.
U.S. Appl. No. 11/241,320—Non-Final Office Action dated Oct. 7, 2009.
U.S. Appl. No. 11/240,139—Non-Final Office Action dated Oct. 6, 2009.
U.S. Appl. No. 11/240,084—Final Office Action dated Apr. 15, 2009.
U.S. Appl. No. 11/240,084—Non-Final Office Action dated Dec. 16, 2009.
U.S. Appl. No. 11/218,033—Final Office Action dated Mar. 30, 2009.
U.S. Appl. No. 11/218,033—Non-Final Office Action dated Sep. 8, 2009.
U.S. Appl. No. 11/218,186—Non-Final Office Action dated Jun. 23, 2009.
U.S. Appl. No. 11/218,186—Final Office Action dated Feb. 1, 2010.

U.S. Appl. No. 11/562,342—Non-Final Office Action dated May 29, 2009.
U.S. Appl. No. 11/562,342—Final Office Action dated Dec. 21, 2009.
U.S. Appl. No. 11/685,046—Non-Final Office Action dated Jul. 8, 2009.
U.S. Appl. No. 11/685,046—Final Office Action dated Dec. 21, 2009.
JP Patent App. No. 2006-261563—Office Action filed for a related foreign application dated Jan. 19, 2010.
JP Patent App. No. 2006-207199—Office Action filed for a related foreign application dated Feb. 2, 2010.
JP Patent App. No. 2006-058600—Office Action filed for a related foreign application dated Aug. 18, 2009.
JP Patent App. No. 2005-295772—Office Action filed for a related foreign application dated Sep. 15, 2009.
JP Patent App. No. 2005-295772—Notice of Allowance filed for a related foreign application dated Dec. 15, 2009.
JP Patent App. No. 2006-207200—Office Action filed for a related foreign application dated Feb. 2, 2010.
JP Patent App. No. 2006-207194—Office Action filed for a related foreign application dated Jan. 12, 2010.
JP Patent App. No. 2006-261564—Office Action filed for a related foreign application dated Jan. 19, 2010.
JP Patent App. No. 2006-207199—Office Action filed for a related foreign application dated Nov. 17, 2009.
JP Patent App. No. 2007-225913—Office Action filed for a related foreign application dated Dec. 24, 2009.
JP Patent App. No. 2006-256442—Office Action filed for a related foreign application dated Jul. 14, 2009.
JP Patent App. No. 2006-207194—Office Action filed for a related foreign application dated Jun. 23, 2009.
Foreign Patent App. No. JP2006205150—Office Action filed for a related foreign application dated Sep. 28, 2010 corresponding to U.S. Appl. No. 11/192,500.
Foreign Patent App. No. JP2006207198—Office Action filed for a related foreign application dated Sep. 21, 2010 corresponding to U.S. Appl. No. 11/192,836.
Foreign Patent App. No. JP2006256441—Office Action filed for a related foreign application dated Nov. 9, 2010 corresponding to U.S. Appl. No. 11/233,202.
U.S. Appl. No. 10/961,793—Non-Final Office Action dated Oct. 28, 2010.
U.S. Appl. No. 10/961,911—Final Office Action dated Oct. 20, 2010.
U.S. Appl. No. 11/073,055—Non-Final Office Action dated Nov. 23, 2010.
U.S. Appl. No. 11/233,270—Notice of Allowance dated Nov. 30, 2010.
U.S. Appl. No. 11/241,010—Final Office Action dated Oct. 15, 2010.
U.S. Appl. No. 11/240,156—Non-Final Office Action dated Nov. 10, 2010.
U.S. Appl. No. 11/256,479—Non-Final Office Action dated Nov. 23, 2010.
U.S. Appl. No. 11/193,152—Non-Final Office Action dated Mar. 1, 2010.
U.S. Appl. No. 11/193,152—Final Office Action dated Nov. 18, 2010.
U.S. Appl. No. 11/193,151—Non-Final Office Action dated Mar. 29, 2010.
U.S. Appl. No. 11/193,151—Final Office Action dated Nov. 2, 2010.
U.S. Appl. No. 11/192,824—Final Office Action dated Oct. 22, 2010.
U.S. Appl. No. 11/465,747—Final Office Action dated Mar. 9, 2010.
U.S. Appl. No. 11/241,447—Non-Final Office Action dated Dec. 8, 2010.
U.S. Appl. No. 11/193,076—Final Office Action dated Jan. 6, 2011.
U.S. Appl. No. 11/192,630—Final Office Action dated Dec. 8, 2010.
U.S. Appl. No. 11/192,868—Final Office Action dated Dec. 8, 2010.
U.S. Appl. No. 11/193,188—Final Office Action dated Dec. 8, 2010.
U.S. Appl. No. 11/192,615—Non-Final Office Action dated Jan. 4, 2011.
U.S. Appl. No. 11/192,467—Notice of Allowance dated Dec. 22, 2010.
U.S. Appl. No. 11/465,747—Notice of Allowance dated Dec. 28, 2010.
Foreign Patent App. No. JP2006256440—Office Action filed for a related foreign application dated Oct. 19, 2010 corresponding to U.S. Appl. No. 11/233,270.
Foreign Patent App. No. JP2006-058600—Office Action filed for a related foreign application dated Aug. 18, 2009 corresponding to U.S. Appl. No. 11/073,055.
Foreign Patent App. No. JP2006-207200—Office Action filed for a related foreign application dated Jun. 1, 2010 corresponding to U.S. Appl. No. 11/192,547.
Foreign Patent App. No. JP2006-207196—Office Action filed for a related foreign application dated Mar. 2, 2010 corresponding to U.S. Appl. No. 11/192,862.
Foreign Patent App. No. JP2006-256441—Office Action filed for a related foreign application dated Mar. 30, 2010 corresponding to U.S. Appl. No. 11/233,202.
Foreign Patent App. No. JP2006-207198—Office Action filed for a related foreign application dated Mar. 2, 2010 corresponding to U.S. Appl. No. 11/192,616.
U.S. Appl. No. 10/961,594—Final Office Action dated Apr. 2, 2010.
U.S. Appl. No. 10/962,103—Non-final Office Action dated May 14, 2010.
U.S. Appl. No. 11/233,201—Final Office Action dated Jun. 3, 2010.
U.S. Appl. No. 11/232,588—Notice of Allowance dated Jun. 23, 2010.
U.S. Appl. No. 11/233,270—Non-final Office Action dated Jun. 9, 2010.
U.S. Appl. No. 11/465,699—Non-final Office Action dated Nov. 16, 2009.
U.S. Appl. No. 11/465,699—Final Office Action dated May 24, 2010.
U.S. Appl. No. 11/465,722—Final Office Action dated Apr. 30, 2010.
U.S. Appl. No. 11/241,011—Final Office Action dated Jun. 29, 2010.
U.S. Appl. No. 11/241,010—Non-final Office Action dated Apr. 15, 2010.
U.S. Appl. No. 11/241,071—Final Office Action dated Apr. 16, 2010.
U.S. Appl. No. 11/241,447—Final Office Action dated Apr. 1, 2010.
U.S. Appl. No. 11/240,039—Notice of Allowance dated Jun. 3, 2010.
U.S. Appl. No. 11/240,156—Final Office Action dated Mar. 31, 2010.
U.S. Appl. No. 11/256,479—Final Office Action dated May 13, 2010.
U.S. Appl. No. 11/192,617—Final Office Action dated Jun. 11, 2010.
U.S. Appl. No. 11/193,076—Non-final Office Action dated Apr. 5, 2010.
U.S. Appl. No. 11/192,630—Non-final Office Action dated Apr. 9, 2010.
U.S. Appl. No. 11/192,546—Final Office Action dated Jul. 14, 2010.
U.S. Appl. No. 11/192,937—First Action Interview Pilot Program Pre-Interview Communication dated Apr. 7, 2010.
U.S. Appl. No. 11/192,616—Final Office Action dated May 26, 2010.
U.S. Appl. No. 11/192,500—Non-final Office Action dated Jul. 21, 2010.
U.S. Appl. No. 11/192,868—Non-final Office Action dated May 19, 2010.
U.S. Appl. No. 11/193,188—Non-final Office Action dated Apr. 19, 2010.
U.S. Appl. No. 11/192,824—Non-final Office Action dated Mar. 1, 2010.
U.S. Appl. No. 11/192,615—Final Office Action dated Apr. 20, 2010.
U.S. Appl. No. 11/192,547—Non-final Office Action dated Jun. 25, 2010.
U.S. Appl. No. 11/192,467—Final Office Action dated Jun. 25, 2010.
U.S. Appl. No. 11/256,493—Non-final Office Action dated Mar. 9, 2010.
U.S. Appl. No. 11/465,752—Final Office Action dated Apr. 2, 2010.
U.S. Appl. No. 11/241,320—Final Office Action dated Jun. 17, 2010.
U.S. Appl. No. 11/240,139—Final Office Action dated Jun. 9, 2010.
U.S. Appl. No. 11/536,115—Non-final Office Action dated Jun. 15, 2010.

U.S. Appl. No. 11/218,033—Final Office Action dated May 14, 2010.
E. Uemukai Toshiaki, A WWW Browsing System in Remote Display Environments, IPSJ magazine, Information Processing Society of Japan, Publication Date: Sep. 15, 2000, vol. 41, No. 9, p. 2364 to 2373.
Foreign Patent App. No. JP2006256440—Office Action filed for a related foreign application dated Jun. 7, 2010 corresponding to U.S. Appl. No. 11/233,270.
Foreign Patent App. No. JP2006261564—Office Action filed for a related foreign application dated Jun. 15, 2010 corresponding to U.S. Appl. No. 11/241,010.
Foreign Patent App. No. JP2006207195—Office Action filed for a related foreign application dated Jul. 27, 2010 corresponding to U.S. Appl. No. 11/192,617.
U.S. Appl. No. 10/962,248—Final Office Action dated Aug. 17, 2010.
U.S. Appl. No. 10/961,594—Non-Final Office Action dated Sep. 15, 2010.
U.S. Appl. No. 11/233,202—Non-Final Office Action dated Jul. 27, 2010.
U.S. Appl. No. 11/233,201—Non-Final Office Action dated Sep. 15, 2010.
U.S. Appl. No. 11/232,552—Final Office Action dated Aug. 19, 2010.
U.S. Appl. No. 11/241,501—Final Office Action dated Jul. 22, 2010.
U.S. Appl. No. 11/241,497—Notice of Allowance dated Aug. 11, 2010.
U.S. Appl. No. 11/241,498—Final Office Action dated Jul. 22, 2010.
U.S. Appl. No. 11/192,862—Non-Final Office Action dated Jul. 26, 2010.
U.S. Appl. No. 11/192,937—Notice of Allowance dated Sep. 7, 2010.
U.S. Appl. No. 11/192,865—Final Office Action dated Mar. 4, 2010.
U.S. Appl. No. 11/192,865—Non-Final Office Action dated Sep. 2, 2010.
U.S. Appl. No. 11/192,629—Final Office Action dated Aug. 25, 2010.
U.S. Appl. No. 11/192,796—Notice of Allowance dated Sep. 10, 2010.
U.S. Appl. No. 11/256,493—Final Office Action dated Aug. 20, 2010.
U.S. Appl. No. 11/240,084—Final Office Action dated Aug. 6, 2010.
F.D. Wright, Design Goals for an Internet Printing Protocol, Apr. 1999, pp. 1-43, http://tools.ietf.org/html/rfc2567.
R. Herriot, Internet Printing Protocol (IPP): Event Notifications and Subscriptions (Feb. 21, 2003, retrieved from http://tools.ietf.org/html/draft-ietf-ipp-not-spec-11 on Aug. 20, 2008, pp. 1-101).
T. Hastings, "Internet Printing Protocol/1.1: Model and Semantics" (Sep. 2000, retrieved from http://www.ietf.org/rfc/rfc291.txt on Sep. 18, 2008, pp. 1-210).
R. Herriot, Internet Printing Protocol (IPP): Event Notifications and Subscriptions, Jun. 21, 2004, http://tools.ietf.org/html/draft-ietf-ipp-not-spec-12, pp. 1-98.
Microsoft Corporation. Microsoft Computer Dictionary, Fifth Edition, 2002 Microsoft Press, pp. 487-488.
Gaedke, Martin et al. "A Modeling Approach to Federated Identity and Access Management", May 2005 ACM.
FOLDOC. "relational database", Jun. 2002, retrieved from <http://foldoc.org/index.cgi?query=relational+database>.
Oasis. "Security Assertion Markup Language (SAML) 2.0 Technical Overview", Working Draft 01, Jul. 22, 2004, <http://www.oasis-open.org/committees/documents.php?wg_abbrev=security>.
Hartman, Bret et al. Mastering Web Services Security, 2003 Wiley Publishing, Inc., pp. 36-46.
U.S. Appl. No. 10/962,248—Office Action dated Aug. 19, 2008.
U.S. Appl. No. 10/961,793—Office Action dated Jun. 20, 2008.
U.S. Appl. No. 10/961,793—Office Action dated Dec. 19, 2008.
U.S. Appl. No. 10/961,911—Office Action dated Oct. 28, 2008.
U.S. Appl. No. 10/961,594—Office Action dated Dec. 3, 2008.
U.S. Appl. No. 10/961,594—Office Action dated Mar. 16, 2009.
U.S. Appl. No. 10/962,103—Office Action dated Jul. 9, 2008.
U.S. Appl. No. 10/962,103—Office Action dated Jan. 23, 2009.
U.S. Appl. No. 11/073,055—Office Action dated Sep. 18, 2008.
U.S. Appl. No. 11/073,055—Office Action dated Mar. 4, 2009.
U.S. Appl. No. 11/233,202—Office Action dated Jun. 5, 2008.
U.S. Appl. No. 11/233,202—Office Action dated Dec. 1, 2008.
U.S. Appl. No. 11/233,201—Office Action dated Oct. 3, 2008.
U.S. Appl. No. 11/232,552—Office Action dated Nov. 18, 2008.
U.S. Appl. No. 11/233,270—Office Action dated Sep. 17, 2008.
U.S. Appl. No. 11/241,501—Office Action dated Oct. 23, 2008.
U.S. Appl. No. 11/241,497—Office Action dated Feb. 20, 2009.
U.S. Appl. No. 11/241,497—Office Action dated Aug. 27, 2008.
U.S. Appl. No. 11/241,011—Office Action dated Oct. 8, 2008.
U.S. Appl. No. 11/241,010—Office Action dated Oct. 9, 2008.
U.S. Appl. No. 11/241,071—Office Action dated Mar. 3, 2009.
U.S. App. No. 11/241,071—Office Action dated Sep. 19, 2008.
U.S. Appl. No. 11/241,447—Office Action dated Mar. 5, 2009.
U.S. Appl. No. 11/241,447—Office Action dated Sep. 15, 2008.
U.S. Appl. No. 11/241,498—Office Action dated Sep. 16, 2008.
U.S. Appl. No. 11/241,498—Office Action dated Mar. 5, 2009.
U.S. Appl. No. 11/240,039—Office Action dated Oct. 20, 2008.
U.S. Appl. No. 11/240,156—Office Action dated Aug. 28, 2008.
U.S. Appl. No. 11/240,156—Office Action dated Feb. 20, 2009.
U.S. Appl. No. 11/255,611—Office Action dated Mar. 12, 2009.
U.S. Appl. No. 11/256,479—Office Action dated Nov. 4, 2008.
U.S. Appl. No. 11/255,333—Office Action dated Mar. 13, 2009.
U.S. Appl. No. 11/193,154—Office Action dated Dec. 2, 2008.
U.S. Appl. No. 11/192,630—Office Action dated Jan. 21, 2009.
U.S. Appl. No. 11/192,546—Office Action dated Jan. 22, 2009.
U.S. Appl. No. 11/192,836—Office Action dated Jul. 9, 2008.
U.S. Appl. No. 11/193,147—Office Action dated Jul. 9, 2008.
U.S. Appl. No. 11/192,868—Office Action dated Feb. 2, 2009.
U.S. Appl. No. 11/192,629—Office Action dated Jan. 22, 2009.
U.S. Appl. No. 11/193,151—Office Action dated Feb. 23, 2009.
U.S. Appl. No. 11/193,188—Office Action dated Jan. 21, 2009.
U.S. Appl. No. 11/193,140—Office Action dated Nov. 18, 2008.
U.S. Appl. No. 11/192,796—Office Action dated Feb. 24, 2009.
U.S. Appl. No. 11/192,547—Office Action dated Feb. 5, 2009.
U.S. Appl. No. 11/240,084—Office Action dated Oct. 30, 2008.
U.S. Appl. No. 11/218,033—Office Action dated Sep. 12, 2008.
Foreign Patent App. No. JP2006205159—Japanese Office Action filed for a related foreign application dated Sep. 27, 2011 corresponding to U.S. Appl. No. 11/192,500.
U.S. Appl. No. 11/232,552—Final Office Action dated Aug. 5, 2011.
U.S. Appl. No. 11/465,722—Non-Final Office Action dated Aug. 5, 2011.
U.S. Appl. No. 11/192,862—Non-Final Office Action dated Oct. 13, 2011.
U.S. Appl. No. 11/192,870—Final Office Action dated Aug. 8, 2011.
U.S. Appl. No. 11/192,500—Non-Final Office Action dated Sep. 30, 2011.
U.S. Appl. No. 11/192,615—Final Office Action dated Oct. 11, 2011.
U.S. Appl. No. 11/465,752—Final Office Action dated Oct. 31, 2011.
U.S. Appl. No. 10/961,594—Notice of Allowance dated Oct. 13, 2011.
U.S. Appl. No. 11/465,699—Notice of Allowance dated Sep. 30, 2011.
U.S. Appl. No. 11/241,011—Notice of Allowance dated Sep. 6, 2011.
U.S. Appl. No. 11/192,617—Notice of Allowance dated Oct. 11, 2011.
U.S. Appl. No. 11/193,076—Notice of Allowance dated Oct. 11, 2011.
U.S. Appl. No. 11/192,546—Notice of Allowance dated Aug. 30, 2011.
U.S. Appl. No. 11/192,616—Notice of Allowance dated Oct. 11, 2011.
U.S. Appl. No. 11/193,151—Notice of Allowance dated Aug. 22, 2011.
U.S. Appl. No. 11/241,320—Notice of Allowance dated Oct. 11, 2011.
U.S. Appl. No. 11/240,139—Notice of Allowance dated Oct. 11, 2011.
U.S. Appl. No. 11/240,084—Notice of Allowance dated Oct. 11, 2011.
U.S. Appl. No. 11/218,033—Notice of Allowance dated Oct. 11, 2011.

U.S. Appl. No. 11/218,186—Notice of Allowance dated Oct. 11, 2011.
Foreign Patent App. No. JP2006261563—Interrogation Report filed for a related foreign application dated Jun. 7, 2011 corresponding to U.S. Appl. No. 11/241,501.
Foreign Patent Appl. No. JP2006207200—Interrogation Report filed for a related foreign application dated Mar. 8, 2011 corresponding to U.S. Appl. No. 11/192,615.
U.S. Appl. No. 10/961,594—Final Office Action dated May 19, 2011.
U.S. Appl. No. 11/073,055—Final Office Action dated Mar. 30, 2011.
U.S. Appl. No. 11/233,202—Final Office Action dated Mar. 23, 2011.
U.S. Appl. No. 11/465,699—Non-Final Office Action dated Mar. 23, 2011.
U.S. Appl. No. 11/241,011—Non-Final Office Action dated Feb. 17, 2011.
U.S. Appl. No. 11/192,617—Non-Final Office Action dated Jun. 9, 2011.
U.S. Appl. No. 11/192,546—Non-Final Office Action dated Feb. 17, 2011.
U.S. Appl. No. 11/192,862—Final Office Action dated Mar. 21, 2011.
U.S. Appl. No. 11/192,870—Non-Final Office Action dated Feb. 22, 2011.
U.S. Appl. No. 11/192,616—Non-Final Office Action dated Jun. 9, 2011.
U.S. Appl. No. 11/192,500—Final Office Action dated Mar. 21, 2011.
U.S. Appl. No. 11/193,151—Non-Final Office Action dated Mar. 16, 2011.
U.S. Appl. No. 11/192,824—Non-Final Office Action dated Jun. 9, 2011.
U.S. Appl. No. 11/192,547—Final Office Action dated Mar. 7, 2011.
U.S. Appl. No. 11/465,752—Non-Final Office Action dated Apr. 1, 2011.
U.S. Appl. No. 11/241,320—Non-Final Office Action dated Jun. 9, 2011.
U.S. Appl. No. 11/240,139—Non-Final Office Action dated Jun. 10, 2011.
U.S. Appl. No. 11/240,084—Non-Final Office Action dated May 12, 2011.
U.S. Appl. No. 11/536,115—Final Office Action dated Mar. 10, 2011.
U.S. Appl. No. 11/218,033—Non-Final Office Action dated Jun. 9, 2011.
U.S. Appl. No. 11/218,186—Non-Final Office Action dated Jun. 16, 2011.
U.S. Appl. No. 10/962,248—Notice of Allowance dated Apr. 1, 2011.
U.S. Appl. No. 10/961,793—Notice of Allowance dated Jun. 10, 2011.
U.S. Appl. No. 10/962,103—Notice of Allowance dated Feb. 22, 2011.
U.S. Appl. No. 11/233,201—Notice of Allowance dated Jun. 24, 2011.
U.S. Appl. No. 11/241,501—Notice of Allowance dated Feb. 17, 2011.
U.S. Appl. No. 11/241,010—Notice of Allowance dated May 27, 2011.
U.S. Appl. No. 11/241,071—Notice of Allowance dated May 3, 2011.
U.S. Appl. No. 11/241,447—Notice of Allowance dated Jul. 13, 2011.
U.S. Appl. No. 11/241,498—Notice of Allowance dated Apr. 1, 2011.
U.S. Appl. No. 11/240,156—Notice of Allowance dated Jul. 12, 2011.
U.S. Appl. No. 11/256,479—Notice of Allowance dated Jul. 13, 2011.
U.S. Appl. No. 11/192,630—Notice of Allowance dated May 31, 2011.
U.S. Appl. No. 11/192,865—Notice of Allowance dated May 19, 2011.
U.S. Appl. No. 11/192,868—Notice of Allowance dated Apr. 29, 2011.
U.S. Appl. No. 11/193,152—Notice of Allowance dated Apr. 8, 2011.
U.S. Appl. No. 11/192,629—Notice of Allowance dated Apr. 11, 2011.
U.S. Appl. No. 11/192,824—Notice of Allowance dated Apr. 20, 2011.
U.S. Appl. No. 11/256,493—Notice of Allowance dated Apr. 15, 2011.

* cited by examiner

METHODS AND SYSTEMS FOR IMAGING DEVICE DYNAMIC DOCUMENT CREATION AND ORGANIZATION

RELATED REFERENCES

This application is a continuation-in-part of U.S. patent application Ser. No. 10/962,248, entitled "Methods and Systems for Imaging Device Remote Application Interaction," filed on Oct. 8, 2004; this application is also a continuation-in-part of U.S. patent application Ser. No. 10/961,793, entitled "Methods and Systems for Imaging Device Remote Form Management," filed on Oct. 8, 2004; this application is also a continuation-in-part of U.S. patent application Ser. No. 10/961,911, entitled "Methods and Systems for Imaging Device Remote Location Functions," filed on Oct. 8, 2004; this application is also a continuation-in-part of U.S. patent application Ser. No. 10/961,594, entitled "Methods and Systems for Imaging Device Remote document Management," filed on Oct. 8, 2004; and this application is also a continuation-in-part of U.S. patent application Ser. No. 10/962,103, entitled "Methods and Systems for Imaging Device Document Translation," filed on Oct. 8, 2004; this application also claims the benefit of U.S. Provisional Patent Application No. 60/704,066, entitled "Methods and Systems for Imaging Device Applications," filed Jul. 28, 2005.

FIELD OF THE INVENTION

Embodiments of the present invention comprise methods and systems for imaging device dynamic document creation and organization.

BACKGROUND OF THE INVENTION

Imaging devices such as printers, copiers, scanners and fax machines can have a wide array of functions and capabilities to fit specific uses or combinations of uses. Imaging devices often take the form of a multi-function peripheral device (MFP) that combines the functions of two or more of the traditionally separated imaging devices. An MFP may combine any number of imaging devices, but typically comprises the functions of a printer, scanner, copier and fax machine.

Some imaging devices may comprise computing resources for data storage and processing such as processors, hard disk drives, memory and other devices. As imaging devices add more features and functions, they become more costly and complex.

More complex imaging devices and MFPs may comprise network connectivity to provide communication with other computing devices, such as personal computers, other imaging devices, network servers and other apparatus. This connectivity allows the imaging device to utilize off-board resources that are available on a connected network.

Imaging devices typically have a user input panel with an array of buttons, knobs and other user input devices. Some devices also have a display panel, which can be for display only or can be a touch panel display that enables user input directly on the display.

Devices with touch panel displays or displays with buttons arranged in cooperation with the display can display menu data that may be selected by user input. This menu data is typically driven by an on-board server module within the imaging device.

BRIEF SUMMARY OF THE INVENTION

Embodiments of the present invention comprise systems and methods for creating, organizing and editing dynamic documents through the use of an imaging device user interface.

Embodiments of the present invention comprise systems, methods and devices for interacting with a remote computing device from an imaging device. These embodiments comprise remote computing devices configured to communicate with imaging devices, imaging devices configured to communicate with remote computing devices and systems comprising various combinations of remote computing devices in communication with imaging devices.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
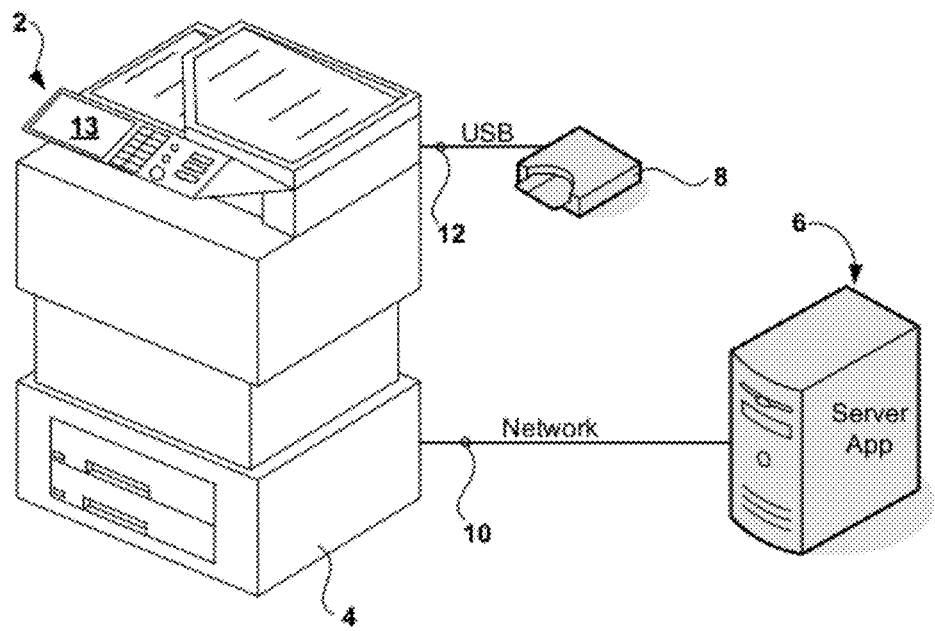
FIG. 1 is a diagram of an embodiment of the present invention comprising an imaging device in connection with a remote computing device.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise interfaces and architecture that integrate imaging devices with remote computing device applications and environments to provide solutions that may not be possible solely with an imaging device alone. Some embodiments comprise an infrastructure and set of interfaces that allow applications on a network to programmatically control imaging device functions and interact with a user through an imaging device input panel. Software functions that are not practical within the imaging device can be performed on the server but are accessible from the imaging device.

For the purposes of this specification and claims, an imaging device (IDev) may be described as a device that performs an imaging function. Imaging functions comprise scanning, printing, copying, image transmission (sending and receiving), image conversion and other functions. Exemplary imaging devices comprise printers, copiers, facsimile machines, scanners, computing devices that transmit, convert or process images and other devices. An IDev may also perform multiple imaging functions. For example, and not by way of limitation, a multi-function peripheral device (MFP), which typically has the capability to perform a plurality of functions comprising a printer, scanner, copier and/or a facsimile machine or image transmitter/receiver, is a type of imaging device. Other MFP imaging devices may comprise other combinations of functions and still qualify as an IDev.

For the purposes of this specification and claims, a remote computing device (RCD) is a device capable of processing data and communicating with other devices through a communications link. An RCD is a remote device because it requires a communications link, such as a network connection, a telephone line, a serial cable or some other wired or wireless link to communicate with other devices such as an imaging device. Some exemplary RCDs are network servers, networked computers and other processing and storage devices that have communications links.

Figure 2:
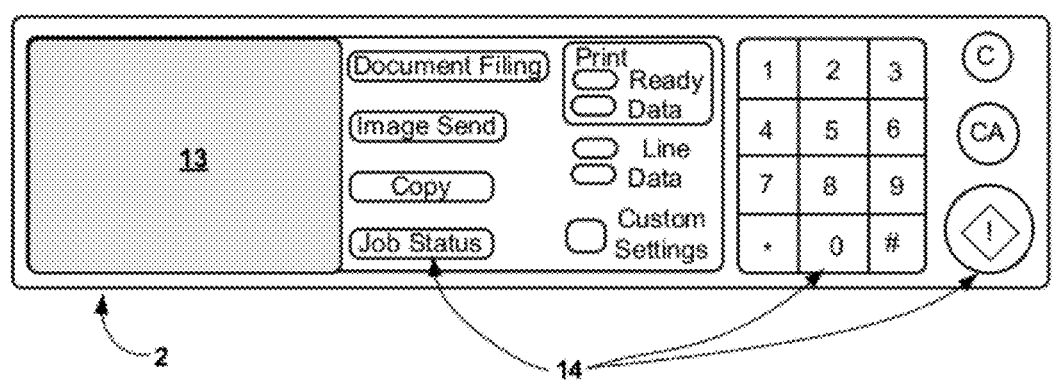
FIG. 2 is an image of an exemplary user interface for an imaging device.

Some embodiments of the present invention may be described with reference to FIGS. 1 & 2. These embodiments comprise an imaging device (IDev) 4 that may be a multi-function peripheral device (MFP) or a single function device. The imaging device 4 further comprises a user interface (UI) panel 2, which may comprise input buttons 14 and a display device 13 or may comprise a touch panel system with or without buttons 14. User input and display may also be performed through a separate UI device 8, which may be connected to the imaging device 4 by a communication link 12, such as a USB connection, a network cable, a wireless connection or some other communications link. UI device 8 may comprise an input device, such as a keyboard or buttons as well as a display device, which may also be a touch screen panel. UI device 8 may also comprise an interface for transfer of instructions that are input to the device 8 from a remote input device. This form of UI device 8 may comprise memory sticks, USB memory cards and other storage devices that may be configured to store input for transfer to an imaging device.

These embodiments further comprise a remote computing device (RCD) 6 that is linked to the imaging device 4 via a communications link 10, such as a network connection. This network connection may be a typical wired connection or a wireless link.

Embodiments of the present invention may provide menu data from the RCD 6 to the imaging device UI panel 2 or remote panel 8 via the network connection 10. Once this menu data is fed to the imaging device 4, an UI panel 2, 8 on the imaging device 4 may be used to interact with applications that run on the remote computing device 6. User input received from UI panels 2, 8 may be returned directly to the remote computing device 6.

A Web Service is a software application identified by a Uniform Resource Identifier (URI), whose interfaces and binding are capable of being defined, described and discovered by Extensible Markup Language (XML) artifacts and supports direct interactions with other software applications using XML based messages via Internet-based protocols.

An application on the remote computing device 6 may use one or more Web Services to control various features in the imaging device 4, such as enabling, disabling or setting device values or controlling device functions.

Embodiments of the present invention allow network applications running on remote computing devices to interact with the user of the imaging device through the imaging device I/O panel. These embodiments allow imaging device user interface (UI) control (i.e., touch panel, button/display) by applications. Some embodiments may also integrate custom display screens or menus with the native imaging device UI. Embodiments may hand off control of imaging device functions between standard operation modes performed on the imaging device in response to user input to an imaging device UI and open systems modes that utilize network resources, such as applications on RCDs, through user input at the imaging device UI.

Embodiments of the present invention comprise network-based applications that have full control over the imaging device UI to display text and graphics in any format. In these embodiments, the application can programmatically display buttons, textboxes, graphics, etc. in any layout desired.

In some embodiments, the UI layout is easy to program using a standard language, such as a markup language. These languages comprise Hypertext Markup Language (HTML), Extensible Markup Language (XML), Wireless Markup Language (WML), Extensible Hypertext Markup Language (XHTML) and other languages.

In some embodiments of the present invention a remote computing device application or server application is able to request a keyboard UI to be displayed on the imaging device display 13, 8. In some embodiments, this functionality is available on the imaging device and does not need to be recreated by remote computing device applications. In some embodiments, the remote computing device may define the keyboard prompt and default values. These embodiments may comprise a remote computing device that is able to rename imaging device UI buttons, such as the OK and Cancel buttons as well as define additional buttons.

In some embodiments, menu templates may be served to the imaging device UI by the imaging device itself 4 or from a remote computing device 6.

External Authorization Application

Some embodiments of the present invention may comprise a remote computing device application that is registered as the External Authorization server. The External Authorization application may control access to the imaging device and may have top-level control of the UI. UI control may be given to this application in the same manner that control is given to an internal auditor.

In these embodiments, when an imaging device system boots, it checks to see if an External Authorization application is registered. If so, the imaging device is placed in disabled mode and the application is contacted to take control of the UI. If the External Authorization server is not available, an error message may be displayed and the device may remain disabled. The imaging device may periodically try to contact the External Authorization server until it is available. Table 1 below describes what entity has control of the UI, in an exemplary embodiment, when the device is in a disabled state.

TABLE 1

UI Control in Disabled State

| Button Press | UI Control | Indicator Lights |
| --- | --- | --- |
| Device boots | External Application | None |
| Document Filing | External Application | None |
| Image Send | External Application | None |
| Copy | External Application | None |
| Job Status | Device - standard Job Status screens | Job Status |
| Custom Settings | Device - standard Custom Settings screens | N/A |
| OS Mode | Not available when device is disabled | |

Remote Computing Device Applications

In embodiments of the present invention, access to the custom UI panels of imaging devices may vary from application to application. Some solutions, such as Document Management integration, may wish to leverage the native Image Send screens, but display some custom UI's to gather additional information about a scan job. Other solutions, like custom printing applications, may be accessed from a separate mode than the native functions.

In order to accommodate the diversified needs of these solutions applications, embodiments may support multiple integration points for UI control. These integration points are based on a user action ("trigger") for which applications may register. In some embodiments, applications may be registered with target devices so that the device knows that when "trigger A" occurs on the front panel to contact "remote computing device B" for instructions. In exemplary embodiments, applications may be integrated with an imaging device at any of several "trigger" points.

Remote computing devices may be registered to a specific function and contacted when that function's hardware key is pressed (e.g. Image Send) on the imaging device UI. Any UI information provided by the remote computing device may be displayed instead of the standard function screens native to the imaging device. This trigger may be used for applications that wish to replace the existing functions with completely custom UI's, such as an alternative scan solution or a specialized display, such as a "Section 508" compatible screen or other specialized-need interface that may have large buttons or other accommodations.

In some embodiments, each function on the imaging device may have a menu on the touch screen that remote computing devices, such as servers, can register. This enables solutions applications to provide custom content and still use some of the standard functionality provided by the imaging device. When a button assigned to a custom application is selected, a menu will be displayed with the solutions registered to that function. Users may select the desired solution and the remote computing device will be contacted for instructions.

In some embodiments, a stand-alone RCD mode that provides remote computing device application access can be accessed from the job queue portion of the UI that is displayed on every screen. This trigger point may be used for applications that do not fit within one of the standard device functions, such as custom printing solutions on an imaging device. When the RCD menu is selected, a menu will be displayed with the solutions applications registered to the generic RCD mode. Users will select the desired solution and the remote computing device will be contacted for instructions.

Hardware Key Interaction

In some embodiments of the present invention, when an imaging device is enabled, additional hardware keys may be used to manage the device. Hardware key assignments for an exemplary embodiment are shown in table 2.

TABLE 2

Exemplary Hardware Key Assignments

| Button Press | Standard IDev Mode | RCD Mode |
| --- | --- | --- |
| Mode keys (Copy, Doc Filing, Image Send) and Custom Settings key | Clear current job settings, move to target screen | Clear current job settings, move to target screen |
| Job Status key | Move to Job Status, maintain current settings & UI location | Move to Job Status, maintain current settings & UI location |
| Clear (C) | Clears settings | Sends clear event to external application |
| Clear All (CA) | Clears settings, cancels job, and returns to default IDev screen | Cancels job and returns to default IDev screen (notification sent to external application) **When External Authorization is controlling the UI, only notification is sent |
| Start | Initiates scan function | Initiates scan function |
| Number keys | Input for copy count or fax numbers | Not used |
| * | Logs user out (disable device and contact External Authorization for screens) | Logs user out (disable device and contact External Authorization for screens) |

In some embodiments, in addition to the * key for logout, a timeout period may be implemented. Some embodiments also comprise an auto clear setting that can be configured for a given period of time, such as 10 to 240 seconds (or disabled). In these embodiments, when there is no activity for the time configured in auto clear, the device may automatically return to disabled mode and attempt to contact a remote computing device to retake control of the UI.

Error & Jam Notifications

Depending on a particular solution, a remote computing device application may have full or only partial control of the imaging device UI and a particular imaging job. In some embodiments, partial control may include cases where a remote computing device is monitoring clicks, but native modes are responsible for the UI interaction and controlling the job. Partial control may also include cases where the remote computing device application is integrated with a native mode (UI trigger=function custom menu). In these embodiments, the imaging device may handle all error and jam notifications with only a notification sent to the relevant remote computing device application.

For some embodiments, in cases where the remote computing device application has full control over the UI and the job, error and jam notifications may be handled differently depending on the type of error. For recoverable errors, a notification may be sent to the remote computing device application and the application may be responsible for displaying messages and resolving the error. For non-recoverable errors, the imaging device and RCD mode may interact to gracefully handle the error condition (e.g. provide user with instructions for clearing jam).

Control Handoffs

In some embodiments, at different points throughout an imaging job, several applications may need control over an imaging device including, but not limited to, an External Authorization application, a standard RCD application, an imaging device native mode and other applications. The following section describes, for an exemplary embodiment, the various steps in an exemplary job, the entities that may have control during each step, and what type of control may be allowed.

Step 1: User provides credentials to access the device at the device UI. This step may be controlled by a remote computing device, such as an External Authorization application or by Internal Accounting (native mode) in the imaging device itself. At the end of this step, the device is enabled. The External Authorization application may also specify default parameters or disable specific job parameters (e.g. default file format is PDF, but user may change; color mode is set to B/W and user may not change).

Step 2: User sets parameters for the job using one of the native imaging device modes or a standard RCD application. At the end of this step the user makes an input to initiate the job. When the input is made, an optional notification may be sent to the standard RCD application, which can then change job parameters if desired. An e-mail application is one example of an application that may request notification when the user input is made. A user may use native Image Send screens or other input to select scan options and choose e-mail recipients. A user may then select a custom application button and choose the scan-to-e-mail option from the menu. The e-mail application may then display custom screens for the user to set permissions for the file. Once a user places the original document(s) on the scanner and initiates the process, the e-mail application may capture the destination parameters set by the user and change the target destination to the e-mail application FTP server. The e-mail application may then receive the file, apply the appropriate permissions, and send to the e-mail recipients selected by the user. A remote computing device application may also want to retake control of the UI at this point, if, as in some embodiments, the application generates thumbnails of the scanned images and displays them to the user for verification.

Step 3: Once the job is initiated, the imaging device is responsible for scanning or RIPing the job and spooling it to the HDD. If the imaging device is configured to authorize jobs with an external authorization application, it may send a click report to the application and wait for instructions. The external authorization application may enable the job for sending/printing, cancel the job, or change job parameters (and then enable). As an example, a rules-based printing application may wish to change job parameters after it receives a click report. Some rules-based printing applications support rules-based printing and scanning that can limit what each user is allowed to do based on the time of day, the destination, or many other parameters. For example, only users in the marketing group may be able to scan high-quality color images. If a user from another group selects color and 600 dpi, a rules-based application may change the parameters to color and 200 dpi. At the end of this step the job should either be authorized or canceled.

Step 4: In some embodiments, this may be an optional step, where the standard RCD application in step 2 may have specified the destination as a HDD for temporary storage. This step may also be used, in some embodiments, by a Java application running on the imaging device. For example, a government office may have a custom encryption application running on the device that takes the scanned document, encrypts it, and then requests the imaging device to send it to the target destination selected by the user in step 2. In some embodiments, it may be beneficial to send a notification to the external authorization application after this step—because the imaging device does not know how long the file will be on the HDD or what the application is going to do with it—and after the send/print step.

Step 5: In the final step, the file is actually output. In typical embodiments, the file is either sent over the network or printed locally. At the end of this step, a notification that the job was successfully completed should be sent to the external authorization application and optionally, to the standard RCD application.

Device Control and Management API's

The API's may be used to allow a remote computing device application to control access to an imaging device for vend applications and to manage the device from a remote location.

Device Control and Vend API

In some embodiments of the present invention, a Device Control and Vend API allows applications to enable and disable access to the device and track click counts. The Device Control and Vend API may provide an RCD with the following controls:

Enable/disable device of function—this may allow an RCD to enable or disable access to the device as a whole or by function to enforce individual user privileges. In some exemplary embodiments, the functions listed in Table 3 may be selectively enabled or disabled by an application.

TABLE 3

Device Functions

| Enable/Disable | Description |
| --- | --- |
| Copy | Copy function (Copy button) |
| Image Send | Scan and fax function, plus send from Doc Filing (Image Send button) |
| Document Filing | All access to Document Filing functions (Document Filing button) |

TABLE 3-continued

Device Functions

| Enable/Disable | Description |
|---|---|
| Print | Network prints, pull print from front panel, and print from Document Filing (No button control) |

Report clicks used—at the end of a successful job, the clicks used may be reported back to an RCD including:

TABLE 4

Job and Page Characteristics

| Item | Copy | Print | Fax Send | PC-Fax | E-mail/ FTP | Broadcast | Scan to HD |
|---|---|---|---|---|---|---|---|
| JOB Characteristics | | | | | | | |
| Job Mode | Yes | Yes | Yes | Yes | Yes | Yes | Yes |
| Broadcast Manage No. | No | No | Yes | Yes | Yes | Yes | No |
| User Name | Yes | Yes | Yes | Yes | Yes | Yes | Yes |
| Address | No | No | Yes | Yes | Yes | # | No |
| Start Time | Yes | Yes | Yes | Yes | Yes | Yes | Yes |
| End Time | Yes | Yes | Yes | Yes | Yes | Yes | Yes |
| Total Page | Yes | Yes | Yes | Yes | Yes | Yes | Yes |
| Result | Yes | Yes | Yes | Yes | Yes | Yes | Yes |
| Error Cause | No | No | Yes | Yes | Yes | Yes | No |
| Doc Filing | Yes | Yes | Yes | Yes | Yes | Yes | Yes |
| Save Mode | *1 | *1 | *1 | *1 | *1 | *1 | *1 |
| File Name | *1 | Yes | *1 | Yes | Yes | *1 | Yes |
| File Size | Yes | Yes | *1 | *1 | *1 | *1 | Yes |
| Resolution | Yes | Yes | Yes | Yes | Yes | Yes | Yes |
| Special | Yes | Yes | Yes | No | Yes | Yes | Yes |
| Finishing | Yes | Yes | No | No | No | No | No |
| File Format | No | No | No | No | Yes | Yes | No |
| Compression | No | No | No | No | Yes | Yes | No |
| PAGE Characteristics | | | | | | | |
| Copy | Yes | Yes | Yes | Yes | Yes | # | Yes |
| Paper Size | Yes | Yes | Yes | Yes | Yes | Yes | Yes |
| Simplex/ duplex | Yes | Yes | Yes | Yes | Yes | Yes | Yes |
| Paper Type | Yes | Yes | Yes | Yes | No | No | Yes |
| Page | Yes | Yes | Yes | Yes | Yes | Yes | Yes |

*1 - Yes when Document Filing is used

Debit mode—in these embodiments, when an application enables the device it may specify if the current job requires authorization. If so, the job will be spooled to memory and click information (e.g., as defined in Table 4) will be sent to an RCD. An RCD will then notify the device if the job should be deleted or output/sent. At this point, the application also has the option of changing job parameters. If the application does not require authorization, the job will continue as normal and a click report will be sent at the end of the job.

Print job accounting—in these embodiments, an RCD may wish to monitor print jobs along with walk-up functions. For print job accounting, an IDev may monitor all incoming print jobs and send accounting data in the PJL header to an RCD for verification before printing the job. The RCD will evaluate the accounting data (or lack thereof) and inform the IDev to continue with or cancel the job.

Report on unidentified jobs—in these embodiments, an RCD may also wish to monitor print jobs that it cannot associate to a specific user, such as device reports and incoming fax jobs. The RCD can register to receive click counts for all unidentified jobs, so that it may bill them to a general account.

Device Management API

In some embodiments of the present invention, a Device Management API allows a network application to remotely setup and manage the imaging device. In exemplary embodiments, the Device Management API may provide an RCD with the following controls:

Device status—an RCD may request the current status of the device. This is the same status information as reported on the embedded web pages.

Device configuration—an RCD can retrieve a list of installed options supported by the device.

Web Page settings—an RCD application can retrieve and set any of the values that are configurable on the embedded web pages.

Key Operator Programs—an RCD application can retrieve and set any of the values that are configurable in Key Operator Programs, including software keys.

Custom Settings—an RCD application can retrieve and set any of the values that are configurable in Custom Settings.

Job Status—an RCD application can retrieve the current job queue and history information and reprioritize or delete jobs in the queue.

Click counts—an RCD application can retrieve device total counts and clicks for each function by account code.

Data Security settings—an RCD application may retrieve the status information on the DSK (e.g. last erase) and initiate data clear functions.

RED data—an RCD can retrieve all data typically sent in a RED message.

Remote reboot—an RCD can initiate a reboot of the imaging device.

The above groupings are provided only as an exemplary embodiment detailing which settings should be included. In some embodiments, actual API's should be grouped by functional areas since there may be overlap between Key Operator settings and web page settings.

Internal Accounting API

In some embodiments, an Internal Accounting API may allow a remote computing device application to configure internal accounting and report click counts. In some exemplary embodiments an Internal Accounting API may include:

Set Auditing Options—an RCD may set auditing options including which modes auditing is enabled for, "account number security", and "cancel jobs of invalid accounts."

Manage Account Codes—an RCD can add, edit, or delete account codes

Account Limits—an RCD application can specify a maximum number of clicks by function for individual account codes or for all account codes Account Reset—an RCD application can reset the click count for an individual account or for all accounts Retrieve Clicks—an RCD can retrieve the number of clicks by function for each account code Font and Form Management API Some embodiments of the present invention may comprise a Font and Form Management API, which allows an RCD application to remotely download and manage fonts and forms in mass-storage. In some exemplary embodiments, a Font and Form Management API may provide a remote computing device with the following controls:

Mass storage control—an RCD application can retrieve mass storage status information including storage capacity, space available, and write-protect mode plus modify write-protect status.

Resource list—an RCD application can retrieve a list of stored fonts and forms including font or macro ID, font number, font/form name, escape sequence, and file size.

Download resource—an RCD application can download PCL fonts, PCL macros, and PS fonts and forms. Any special processing that is performed when a resource is downloaded via the web pages will also be performed when the resource is downloaded via Open Systems.

Delete resource—an RCD application can delete any resource stored in mass storage.

Upload resources—an RCD application can upload an individual or all resources. On devices where effective memory management is unavailable, a server application can use this function to "defrag" mass storage.

Font/macro ID's—an RCD application can assign or modify the ID's assigned to PCL fonts and macros.

Firmware Management API

In some embodiments of the present invention, a Firmware Management API may allow a remote computing device or network application to remotely download and manage the imaging device firmware. In some exemplary embodiments, a Firmware Management API may provide a remote computing device (e.g., a server) with the following controls:

Firmware versions—an RCD application can retrieve the current firmware version numbers.

Service mode—an RCD application can place the MFP in service mode to lockout other jobs that will interfere with firmware upgrade. Upon receiving a service mode request, the IDev will stop accepting incoming jobs, complete all jobs in the queue, and then notify the server that it is in service mode.

Update firmware—an RCD can download an updated firmware version to the device. If a reboot is necessary, the IDev will perform it automatically when download is complete.

Download status—the IDev will send a status notification (success/error) to an RCD after firmware download.

Revert to previous version—if firmware update is not successful, the application can request the IDev to revert to the previous firmware version.

Device Function API's

In some embodiments of the present invention, device function API's allow a remote computing device application to use existing imaging device functionality to provide new custom solutions.

Image Send API

In some embodiments, an Image Send API may provide the remote computing device application with the following controls:

Image Send Parameters—a remote computing device application can get and set values for the following scan and fax parameters:
COLOR OR B/W
IMAGE MODE—TEXT, TEXT/PHOTO, PHOTO; EXPOSURE LEVEL
RESOLUTION
FILE FORMAT—FILE TYPE, COMPRESSION, AND PAGES PER FILE
ORIGINAL—ORIGINAL SIZE, SIMPLEX/DUPLEX, ROTATE, AND JOB BUILD
FILENAME
SUBJECT
MESSAGE
SENDER
SCHEDULE SEND TIME
PAGE DIVISION (BOOK SCANNING)
COVER PAGE
TRANSMISSION MESSAGE (CONFIDENTIAL, URGENT, ETC.)
THIN PAPER SCANNING
DESTINATION
DOCUMENT FILING Initiate Scan—the remote computing device application can initiate the scan function (same as user pressing start button).

In some embodiments, a remote computing device can change the default values on the imaging device or the values for the current job. For the current job, the remote computing device may also specify if scan parameters may be modified by the user or not. If one remote computing device application (e.g. Access Control) specifies that a parameter cannot be changed and then a second application (e.g. Document Management) tries to set the parameter, a notification may be sent to the second application and the setting will not be changed.

Print API

In some embodiments, print jobs may be submitted by remote computing device applications using standard printing channels. In some exemplary embodiments, a Print API may provide a remote computing device with the following additional control:

PJL sniffing—an RCD application can register with the IDev to be contacted for instructions when a specific PJL command is found in a print job. The RCD can then instruct the IDev to replace the command, cancel the job, or continue printing. This interface may be used in applications like accounting and other-brand compatibility.

Copy API

In some embodiments of the present invention, a Copy API may provide a remote computing device with the following exemplary controls:

Copy Parameters—an RCD application can get and set values for the following copy parameters:
COLOR OR B/W
EXPOSURE—TEXT, TEXT/PHOTO, PHOTO, SUPER PHOTO; EXPOSURE LEVEL
PAPER SELECT (BY TRAY)
COPY RATIO
2-SIDED COPY—1TO1, 1TO2, 2TO2, 2TO1; BINDING EDGE
OUTPUT—OUTPUT TRAY, SORT, STAPLE, GROUP, OFFSET
ORIGINAL SIZE
SPECIAL FUNCTIONS—MARGIN SHIFT, ERASE, PAMPHLET, ETC.
DOCUMENT FILING Initiate Copy—an RCD application can initiate the copy function (same as user pressing start button).

In some embodiments, a remote computing device can change the default values on the imaging device or the values for the current job. For the current job, the remote computing device may also specify if copy parameters may be modified by the user or not.

Document Filing API

In some embodiments of the present invention, a Document Filing API may provide a remote computing device with the following exemplary controls:

Backup/restore—the remote computing device application can import and export a batch file with all Document Filing data. In some embodiments, this package will be in a proprietary format since it contains documents that are password-protected and should not be accessed individually—this is typically for restore in case of failure or cloning to other devices.

File/folder list—the remote computing device application can retrieve, modify, and create new files and folders to be stored on the IDev (also covered in device management).

Download file—the remote computing device can download a new file to the Document Filing systems and specify folder, filename, username, and password.

User list—the remote computing device application can retrieve, modify, and create new users to be stored on the IDev (also covered in device management).

HDD Status—the remote computing device application can retrieve the current HDD status including the % allocated to the main folder, quick folder, and custom folders and the % remaining.

Doc Filing Parameters—the remote computing device application can get and set values for storing a file to Doc Filing including:
EXPOSURE
RESOLUTION
ORIGINAL—SIZE, SIMPLEX/DUPLEX
FILE INFORMATION—USERNAME, FILENAME, FOLDER, CONFIDENTIAL, PASSWORD
SPECIAL MODES—ERASE, DUAL PAGE COPY, 2IN1, JOB BUILD, CARD SHOT Initiate Print—the remote computing device application can select a stored file and initiate a print including the following parameters:
PAPER SIZE/SOURCE
OUTPUT—SORT/GROUP, OUTPUT TRAY, STAPLE, PUNCH, OFFSET
SIMPLEX/DUPLEX (TABLET/BOOKLET)
TANDEM PRINT
NUMBER OF COPIES
DELETE OR STORE AFTER PRINTING Initiate Send—the remote computing device application can select a stored file and initiate a send including the following parameters:
RESOLUTION
FILE FORMAT
DESTINATION
TIMER
SENDER
FILENAME
SUBJECT
MESSAGE

Security

Allowing external applications to control an imaging device opens up the imaging device to new security vulnerabilities. In embodiments of the present invention that provide some security measures, the following exemplary items are security concerns that may be addressed by the remote computing device interface.

Access to remote computing device interfaces may be limited to valid applications. Embodiments provide extensive access and control of the imaging device, which poses a significant security risk. The interface of these embodiments may be protected from access by attackers, while maintaining ease of setup and use for valid solutions.

Confidential data (user credentials and job data) may be protected during network transfer. User credentials and job data may be secured during network transfer to ensure that it cannot be stolen, an intruder cannot monitor device activity, and a man-in-the-middle attack cannot change messages. Imaging devices may support Secure Sockets Layer (SSL) and other connections to ensure data is safe while being communicated between the imaging device and remote computing device applications.

Administrators may have the ability to lock-down imaging device access. For users with strict security policies, administrators may have the ability to disable access by remote computing devices or limit access to specific applications. Administrators may have an option to register the limited applications that they wish to access the imaging device interfaces.

Remote computing device applications may ensure the imaging device is not being "spoofed." The remote computing device may be able to authenticate an imaging device that it is contract with it to ensure an intruder cannot imitate the imaging device to collect network configuration and password information, monitor file/folder structures of a document management system, or spoof security settings and DSK status of the imaging device.

A remote computing device may ensure that the server is not being "spoofed." The imaging device must be able to authenticate all remote computing devices that it is in contact with to ensure that an intruder is not spoofing the remote computing device's IP address. By pretending to be the remote computing device, an intruder could steal user credentials, redirect scanned documents, change device settings or firmware, or bring down the access control system (either to provide access to unauthorized users or initiate a denial of service attack for valid users).

Access control/vend applications may not be compromised when a remote computing device is unavailable. When the remote computing device is unavailable, it may not be acceptable to provide open access to the device. If the remote computing device is unavailable at startup or becomes unavailable at anytime (e.g. someone disconnects network cable), the imaging device may immediately be disabled and an error message displayed.

An administrator may be able to adjust a security level based on company and application requirements. Security requirements can have a large impact on the time it takes to develop a remote computing device application and the resources required to implement the solution. Users using some embodiments may range from a small business with one imaging device, no IT staff, and a simple scan or print application to a large government office using access control and audit trails to track all device activity. The security measures used to protect imaging device interfaces may be adjustable by the administrator to match the target environment.

The imaging device and remote computing device applications may be able to hand-off user credentials. Users may be prompted to login at multiple points throughout a job. For example, an access control application or accounting application may control total device access, the imaging device may have user authentication enabled for Image Send, and a document management application may require user login before showing a folder list. In many environments, all of these applications will use a common user database. In some embodiments, it is, therefore, desirable for the applications to pass user credentials to each other, so that each one does not have to repeat the authentication process.

Figure 3:
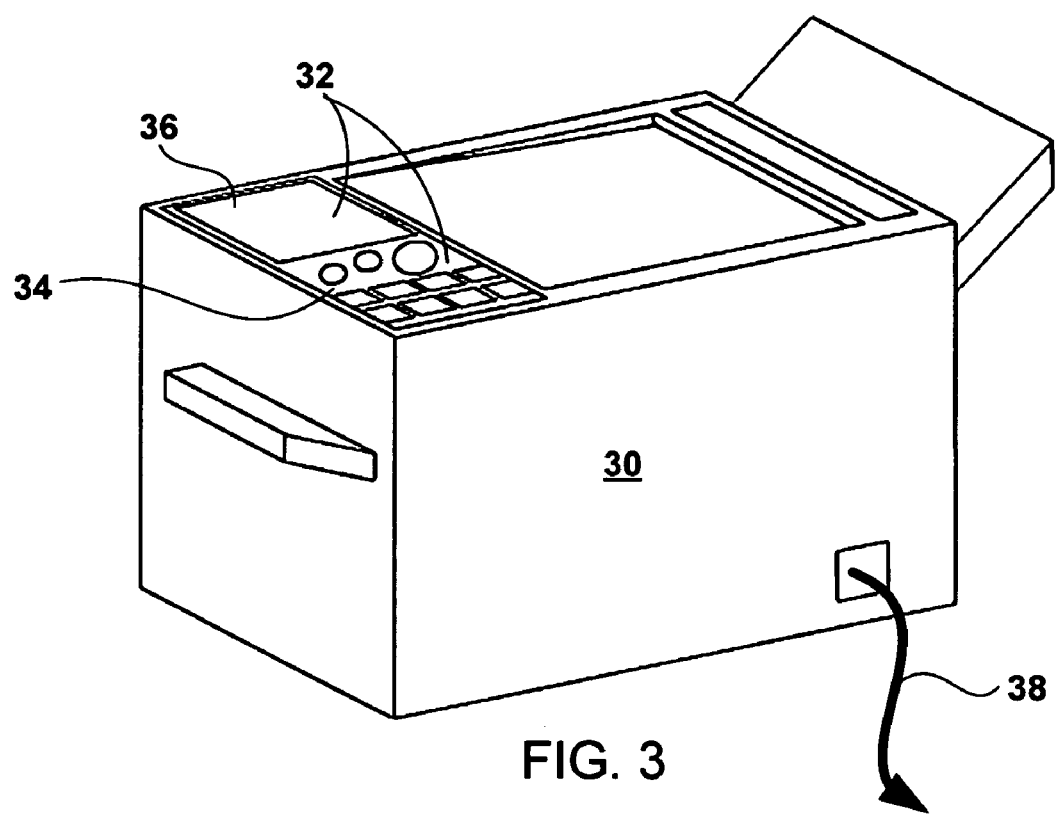
FIG. 3 shows an exemplary imaging device.

Some embodiments of the present invention may be described with reference to FIG. 3. These embodiments comprise an imaging device only, which is configured to interact with a remote computing device, such as a server through a communications link. The imaging device 30 comprises a user interface 32, which comprises a user input device 34, such as a keypad, one or more buttons, knobs or switches or a touch-screen panel and a display 36, which may comprise user input device 34 in the form of a touch-screen panel.

Imaging device 30 will typically be capable of performing one or more imaging functions including, but not limited to, scanning, printing, copying, facsimile transmission (sending and receiving) and others.

These embodiments further comprise a communications link 38, which may be a wired connection (as shown in FIG.

3) comprising a network cable, a Universal Serial Bus (USB) cable, a serial cable, a parallel cable, a powerline communication connection such as a HomePlug connection or other wired connections. Alternatively, the communications link 38 may comprise a wireless connection, such as an IEEE 802.11 (b) compliant connection, a Bluetooth connection, an Infrared Data Association (IrDA) connection or some other wireless connection.

Figure 4:
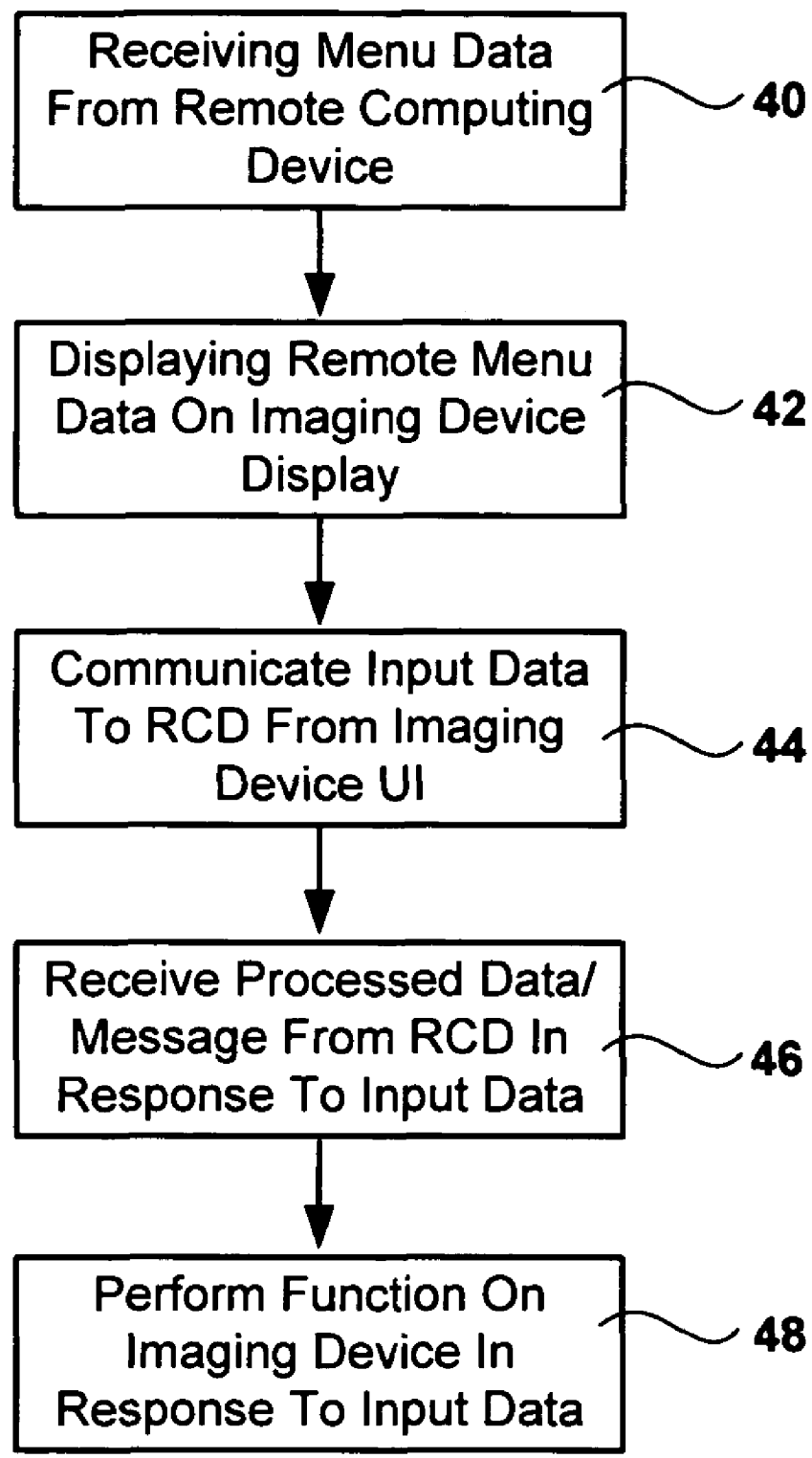
FIG. 4 is a chart depicting steps of an imaging device method.

The operation of some imaging device embodiments may be explained with reference to FIG. 4. In these embodiments, menu data is received 40 from a remote computing device (not shown in FIG. 3), which is connected to the imaging device 30 via the communication link 38 through a wired or wireless connection. This menu data is then displayed 42 on the imaging device user interface display 36. This display of remote menu data is intended to prompt a user to make an input on the user interface input device 34.

Imaging devices of these embodiments are further configured to accept input from a user in response to a display of remote menu data and communicate 44 that user input to a remote computing device. In some embodiments, this user input data will be processed by a remote computing device. This may comprise running an application on the remote computing device. This processing may also comprise accessing and communicating data that is stored on the remote computing device.

The imaging devices of these embodiments are further configured to receive 46 data resulting from processing the user input data. This may comprise data generated by an application running on the remote computing device in response to the user input. The imaging device may also receive data that was stored on a remote computing device, such as a file server, in response to processing the user input.

Once the imaging device 30 has received 46 the processed data, the imaging device 30 may perform 48 a native function in response to the data or using the data. For example, and not be way of limitation, the imaging device 30 may print a document that was stored on the remote computing device and modified on the remote computing device according to the user input. As another non-limiting example, the imaging device 30 may active or enable functions (i.e., scanning, copying, printing, fax transmission) on the imaging device in response to the receipt 46 of processed data.

Figure 5:
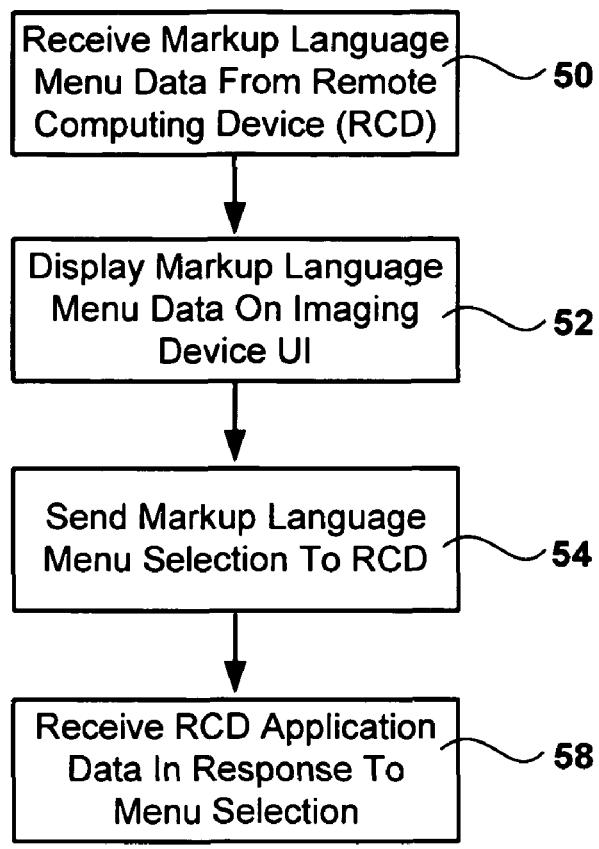
FIG. 5 is a chart depicting steps of an imaging device method using a markup language.

Some, more specific, imaging device embodiments may be explained with reference to FIG. 5. In these embodiments, the imaging device 30 is configured to receive 50 menu data formatted in a markup language from a remote computing device. The communication link by which the menu data is communicated may be established and maintained using a Hypertext Transfer Protocol (HTTP). The markup language may comprise terms from Hypertext Markup Language (HTML), Extensible Markup Language (XML), Wireless Markup Language (WML), Extensible Hypertext Markup Language (XHTML) and/or other languages.

Once the menu data is received 50, it may be displayed 52 on the imaging device user interface display 36. As in previously described embodiments, the menu data is typically intended to prompt user input on imaging device user interface 32. Display 52 of the remotely-stored menu data may be accomplished with a browser application that is native to the imaging device 30.

In these embodiments, the imaging device 30 is further configured to route 54 user input received though its user interface 32 to a remote computing device. The remote computing device that receives the user input may then run an application or otherwise process the user input and return the results of the processing the imaging device 30. Accordingly, the imaging device 30 is further configured to receive 58 processed data from a remote computing device. In some embodiments, the imaging device 30 may perform one or more functions in response to the receipt 58 of processed data.

Figure 6:
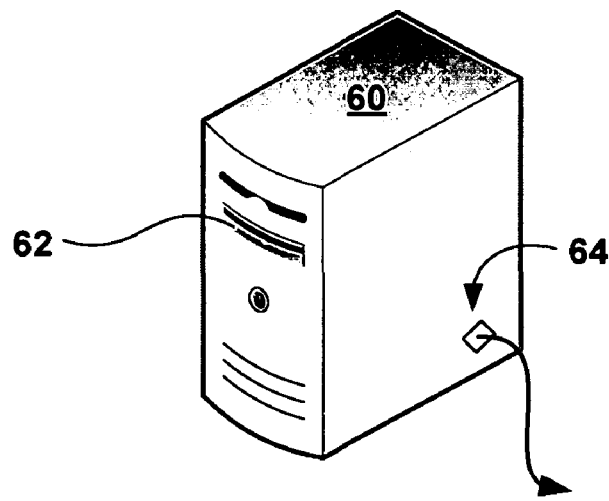
FIG. 6 shows an exemplary remote computing device embodiment.

Some embodiments of the present invention may be explained with reference to FIG. 6. These embodiments comprise a remote computing device (RCD) 60, which has a communications link 64. Communications link 64 may be a wired connection (as shown in FIG. 6) comprising a network cable, a Universal Serial Bus (USB) cable, a serial cable, a parallel cable, a powerline communication connection such as a HomePlug connection or other wired connections. Alternatively, the communications link 64 may comprise a wireless connection, such as an IEEE 802.11(b) compliant connection, a Bluetooth connection, an Infrared connection, such as those defined in the Infrared Data Association (IrDA) standard or some other wireless connection. In some embodiments, RCD 60 may further comprise a data storage device 62, which is typically a hard drive, but may also be an optical drive device, such as an array of compact disk drives, flash memory or some other storage device.

Figure 7:
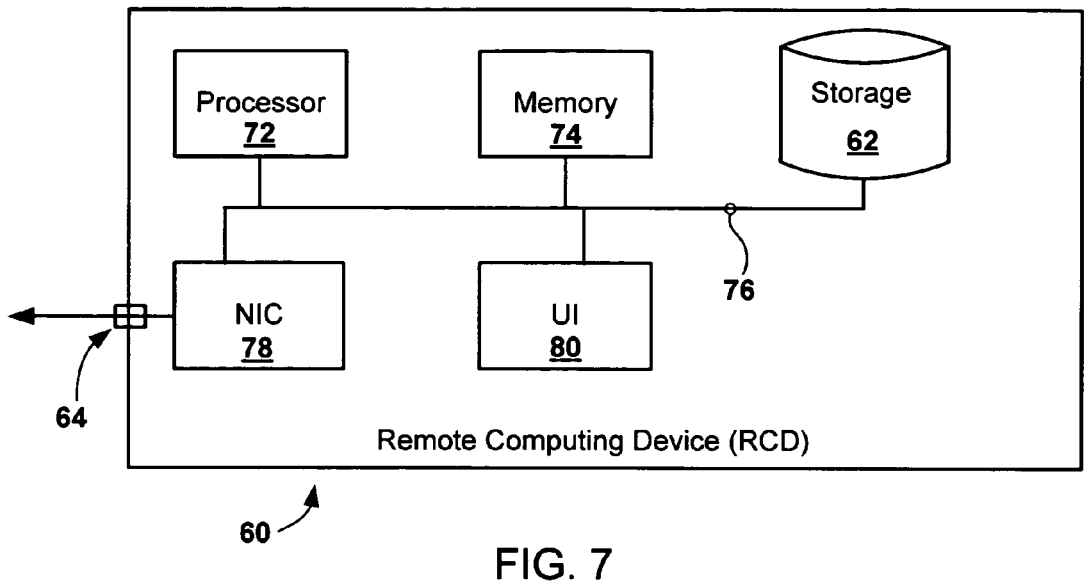
FIG. 7 is a diagram showing components of an exemplary remote computing device.

Embodiments of RCD 60 may be further described with reference to FIG. 7. In these embodiments, RCD 60 comprises a processor 72 for processing data and running programs such as operating systems and applications. RCD 60 may further comprise memory 74, which may be in the form of Random Access Memory (RAM) and Read Only Memory (ROM). Generally, any applications processed by processor 72 will be loaded into memory 74. RCD 60 may further comprise a network interface 78, which allows RCD 60 to communicate with other devices, such as an imaging device 30. In some embodiments, RCD 60 may also comprise a user interface 80, but this is not required in many embodiments. Storage 62 may be used to store applications and data that may be accessed by an imaging device 30 of embodiments of the present invention. Processor 72, memory 74, storage 62, network interface 78 and, optionally, user interface 80 are typically linked by a system bus 76 to enable data transfer between each component. Communications link 64 may couple the RCD 60 to other devices via network interface 78.

Figure 8:
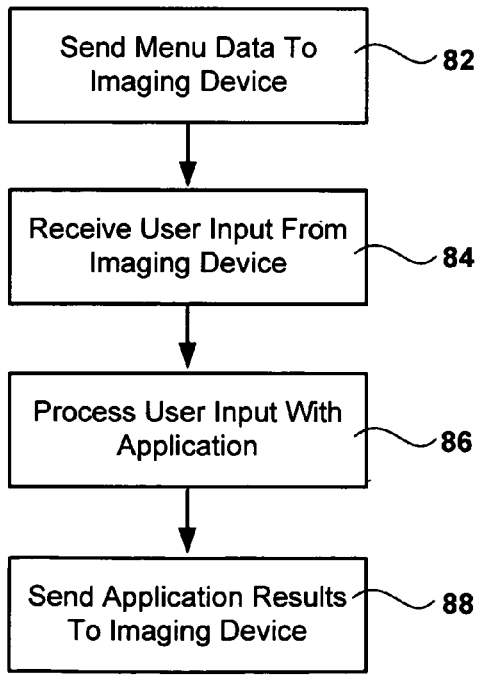
FIG. 8 is a chart showing steps of a remote computing device method.

In some embodiments, described with reference to FIG. 8, an RCD 60 may comprise menu data stored on storage device 62 or in memory 74. This menu data may be configured for display on an imaging device user interface 32. Menu data may be stored in many formats and configurations. In some embodiments menu data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages. In these embodiments, menu data may be sent 82 through a communications link 64 to an imaging device 30. Accordingly, menu data configured for display on an imaging device is stored on RCD 60.

An RCD 60, of some embodiments, will be further configured to receive 84 user input obtained through the user interface 32 of an imaging device 30 and transferred to the RCD 60 over communications links 38 & 64. Once this input data is received at an RCD 60, the input data may be processed 86. This processing 86 may comprise conversion of the data to a new format, execution of commands contained within the data or some other process. Once the input data has been processed 86, the processed output may be sent 88 back to the imaging device 30 where the processed output may be used in an imaging device process or function.

Figure 9:
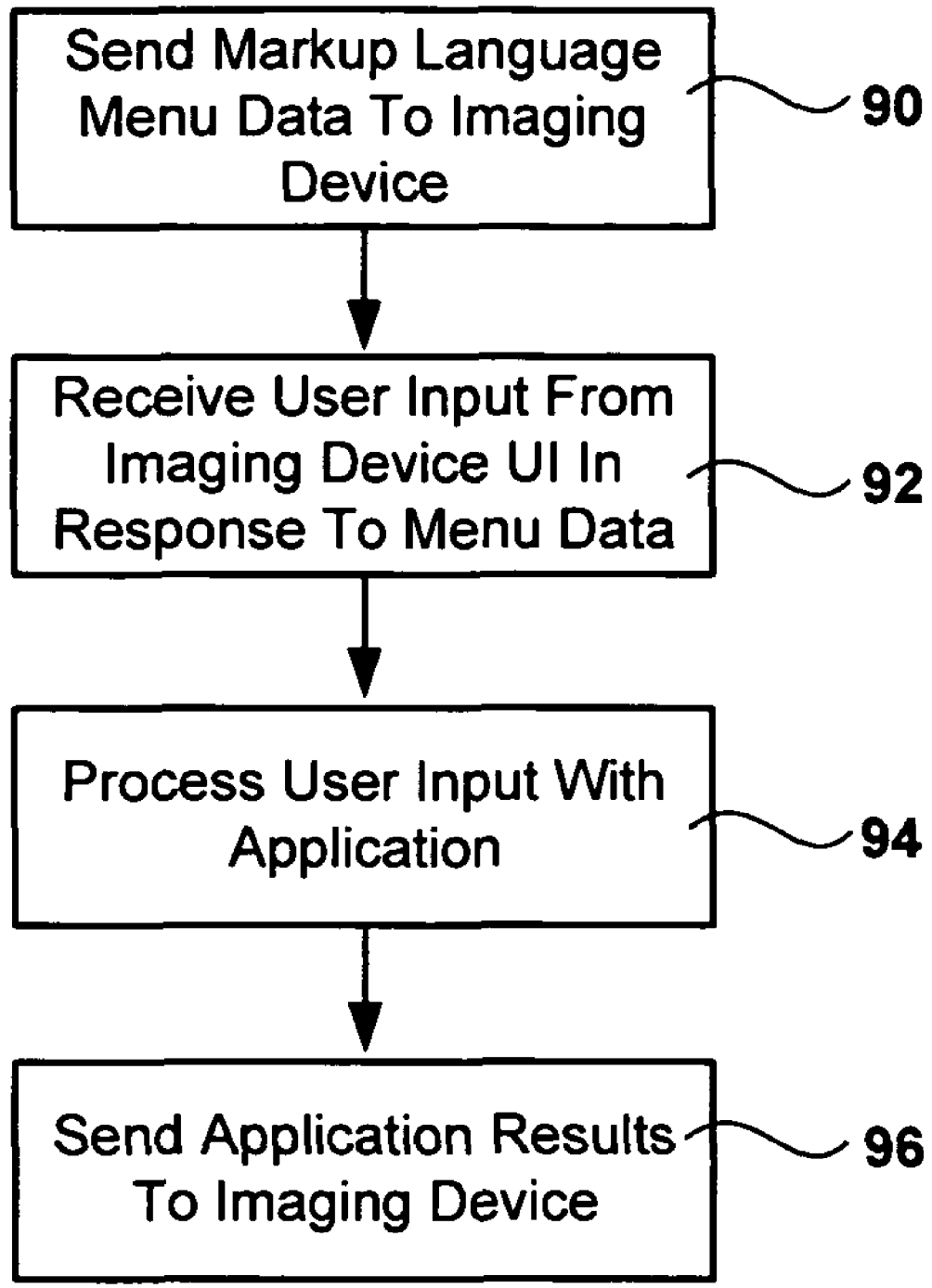
FIG. 9 is a chart showing steps of a remote computing device method using a markup language.

In some embodiments, as described with reference to FIG. 9, an RCD 60 may send 90 menu data configured for an imaging device display 36 using a markup language. The markup language menu data is then received at the imaging device 30 and displayed to a user. Typically, this will prompt the user to enter an input on the imaging device user interface 32. This user input will then be sent by the imaging device 30 to the RCD 60. The RCD 60 will then receive 92 the input data prompted by the display of the menu data on the imaging device 30. Once received, the input data may be processed 94 on the RCD 60. Processing may comprise the selection, recordation and/or modification of a form, document or other data stored on RCD 60, the authorization of a user identified by the user input, the translation of a document input by the user, generation of a map or other directions related to user input or some other process or function. After this processing 94, the processing result may be sent 96 to the imaging device.

Figure 10:
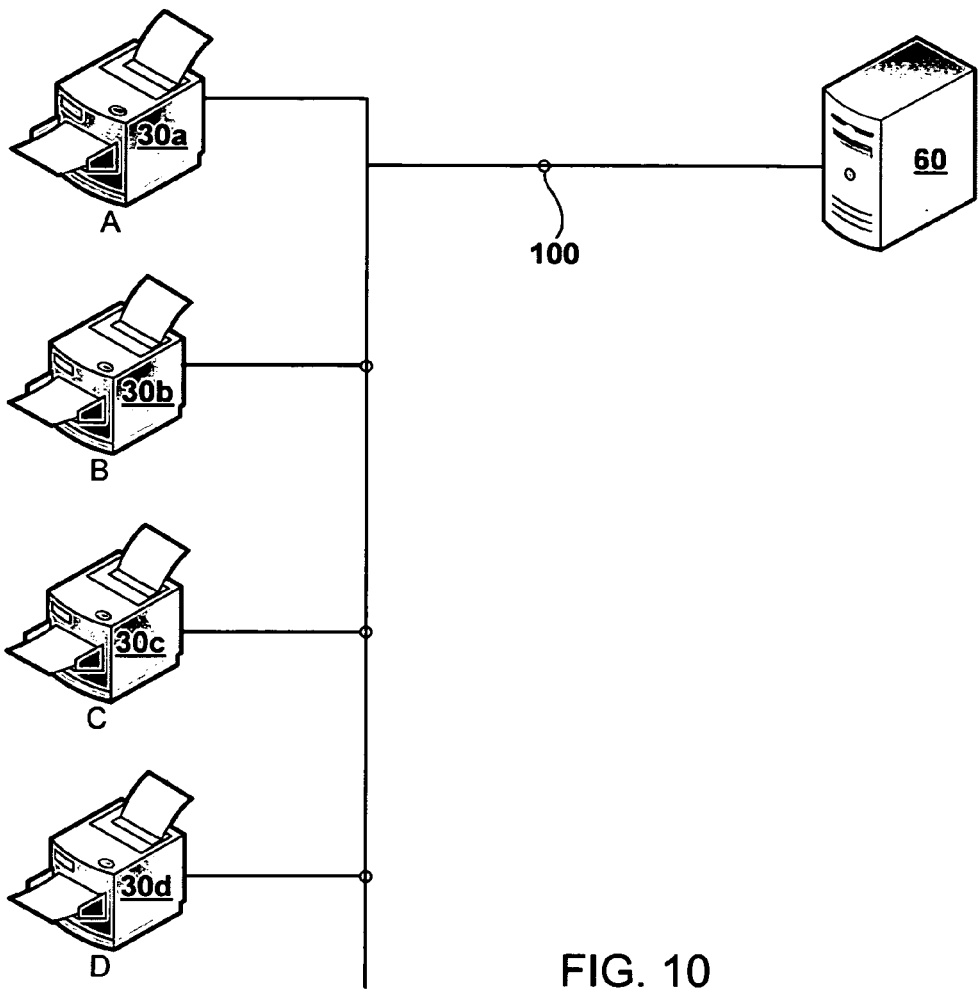
FIG. 10 is a diagram showing a system comprising multiple imaging devices in connection with a remote computing device.
Figure 11:
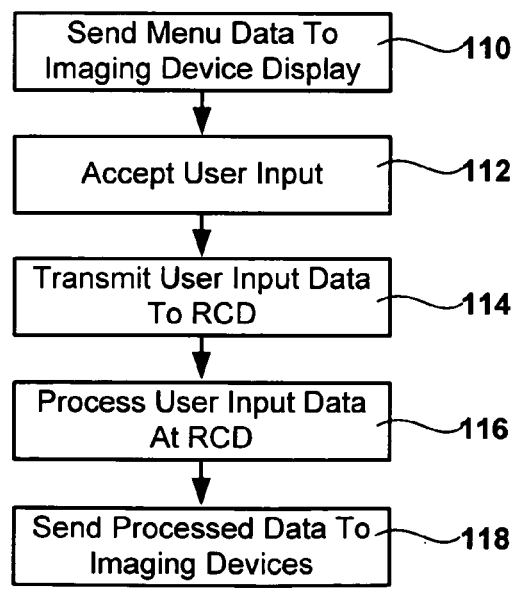
FIG. 11 is a chart showing steps of a method comprising RCD processing of user input data.

Some embodiments of the present invention may be described with reference to FIGS. 10 & 11. These embodiments comprise at least one RCD 60 and a plurality of imaging devices 30*a*-30*d*. In these embodiments, at least one of the imaging devices 30*a*-30*d* comprises a user interface 32 with a display 36 and user input panel 34 that is integral with the display (i.e., touch-screen) or a separate input unit. RCD 60 is connected to imaging devices 30*a*-30*d* by a communications link and network 100 to enable data transmission between RCD 60 and imaging devices 30*a*-30*d*.

In these embodiments, menu data is stored on RCD 60 and sent 110 to at least one of the imaging devices 30*a*-30*d* where the menu data is displayed on a user interface. Any of Imaging devices 30*a*-30*d* that receive the menu data are configured to accept 112 and transmit 114 user input to an RCD 60. Once the user input data is received at the RCD, the data may be processed 116 as discussed in previously described embodiments. The result of processing 116 may then be sent 118 back to any combination of the imaging devices 30*a*-30*d*.

In these embodiments, a single RCD 60 may be used to provide processing power, resources and functionality to a plurality of imaging devices 30*a*-30*d* without reproducing these resources in each imaging device. In some embodiments, data generated by input on one imaging device 30*a* may be directed to another imaging device 30*d* for processed data output or final processing.

Dynamic Document Creation Embodiments

Some embodiments of the present invention may comprise an imaging device (IDev) with internal processing capabilities. Other embodiments may comprise an imaging device (IDev) in communication with one or more remote computing devices (RCDs) on which processing may be performed.

Figure 12:
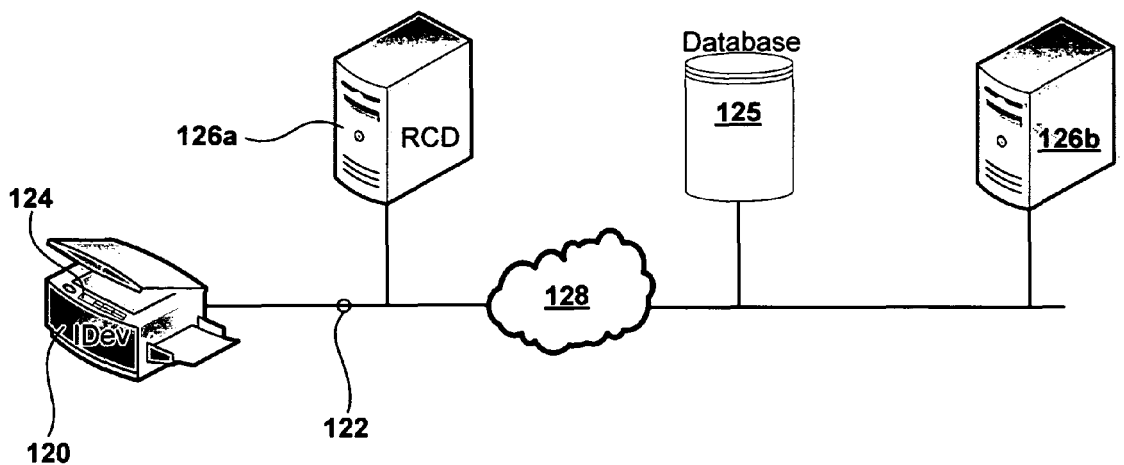
FIG. 12 is a diagram showing components of some embodiments comprising linked resources.

Some embodiments of the present invention may be described with reference to FIG. 12. In these embodiments, an imaging device (IDev) 120 comprises a user interface 124, which comprises a user input device and a display as described in relation to other embodiments. The imaging device 120 is connected to other devices through a communication link 122, which may comprise a wired or wireless network connection or some other connection. The imaging device 120 may be connected to a remote computing device (RCD) 126 residing on a local area network (LAN) or similar local communication link. A remote computing device 126*b* may also reside on a wide area network (WAN) or even a global network, such as the internet 128. The imaging device 120 may also be connected to other devices, such as a database server 125 and other computing devices, storage devices, output devices and/or other device capable of communicating with the IDev 120.

In an exemplary embodiment of a dynamic document creation and editing application, a user, through the use of an imaging device (IDev) user interface (UI), may select a document format, such as a business letter, invoice, vacation request or some other document format. A document format may comprise one or more parameters for defining a page size, page orientation, single-sided, double-sided, margins, headers, footers, columns, text boxes, graphics boxes and other formatting options. In some embodiments, a document format may comprise a predefined template.

A user, through the IDev UI, may also define a dynamic field structure for a dynamic document. A dynamic field structure may comprise one or more data fields for text, numerical data, graphics, images or other field types.

A dynamic field structure may also comprise field display characteristics. Field display characteristics may comprise a field size, field shape, field color, field background color field shading, font size, field rotation, field orientation and other characteristics that affect the way field content is displayed on a display screen or output to media. In an exemplary embodiment comprising a company advertisement flyer, dynamic field display characteristics may comprise a text color, background color, text font size, text orientation and other characteristics.

A dynamic field structure may also comprise a field relationship. A filed relationship may comprise a relationship between field content and the content of another field or a relationship between field content and other data. A field relationship may comprise a geographical relationship, a mathematical relationship, a logical relationship, such as with Boolean logic, or another relationship. In an exemplary embodiment comprising a purchase order form, a field relationship may comprise a mathematical relationship for a total amount field that is a summation of the column above that field.

In addition to a document format and a dynamic field structure, a dynamic document may comprise static content. A user may specify static content, such as text, graphics, images, or other content that remain in a static state on the document. In an exemplary embodiment comprising a company letter, static content may comprise a company logo and/or text denoting the company name. This static content will remain constant when other field content may vary, such as an addressee field or a signature block field.

Some embodiments of the present invention may be described with reference to FIG. 13A. In these embodiments, a user may select a document format such as a business letter 130A or an invoice 140A. This data relating to this document format may comprise page size, page orientation, single-sided pages, double-sided pages, margins, headers, footers, columns, and other formatting options. In some embodiments a document format may be selected by a pre-defined template.

A user may also define dynamic field structures for a document. These dynamic field structures may comprise one or more fields that may be populated with many types of information that may be linked or related to the field with a field relationship, such as a link to a remote site or a mathematical relationship to another field. A field structure typically comprises field types, field display characteristics and field relationships. In the exemplary business letter embodiment 130A shown in FIG. 13A, field types comprise an address line field 133A, a date field 134A, a RE: line field 135A, a salutation field 136A, a field for the letter body 137A and a signature field 138A.

In addition to a document format and a document field structure, a user may also designate document static content. This static content may include graphics, such as a company logo 131A or images and text such as a company letterhead 141A or 132A. Static content may also include column headings 148A, numbers and other data that is intended to be communicated by each instance of the document.

Once these three document elements have been defined, they may be compiled into a dynamic document that may automatically populate its fields when it is selected and generated by a user at an imaging device. In some embodiments, the fields may be linked or related to user data once the user is identified through a login process or another identification process.

Figure 13A:
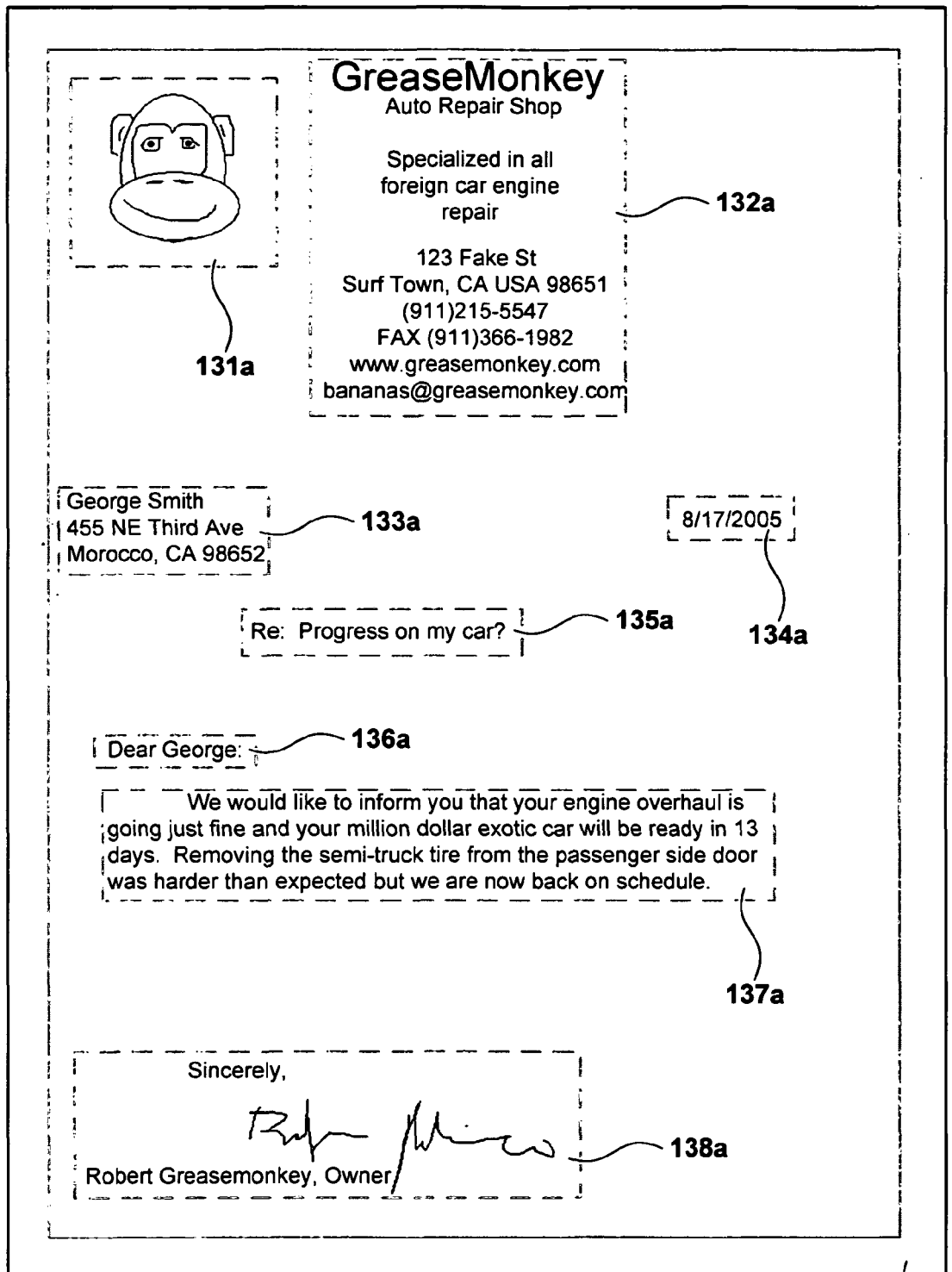
FIG. 13 is a chart showing steps of an embodiment comprising a form building application at an imaging device.
Figure 13B:
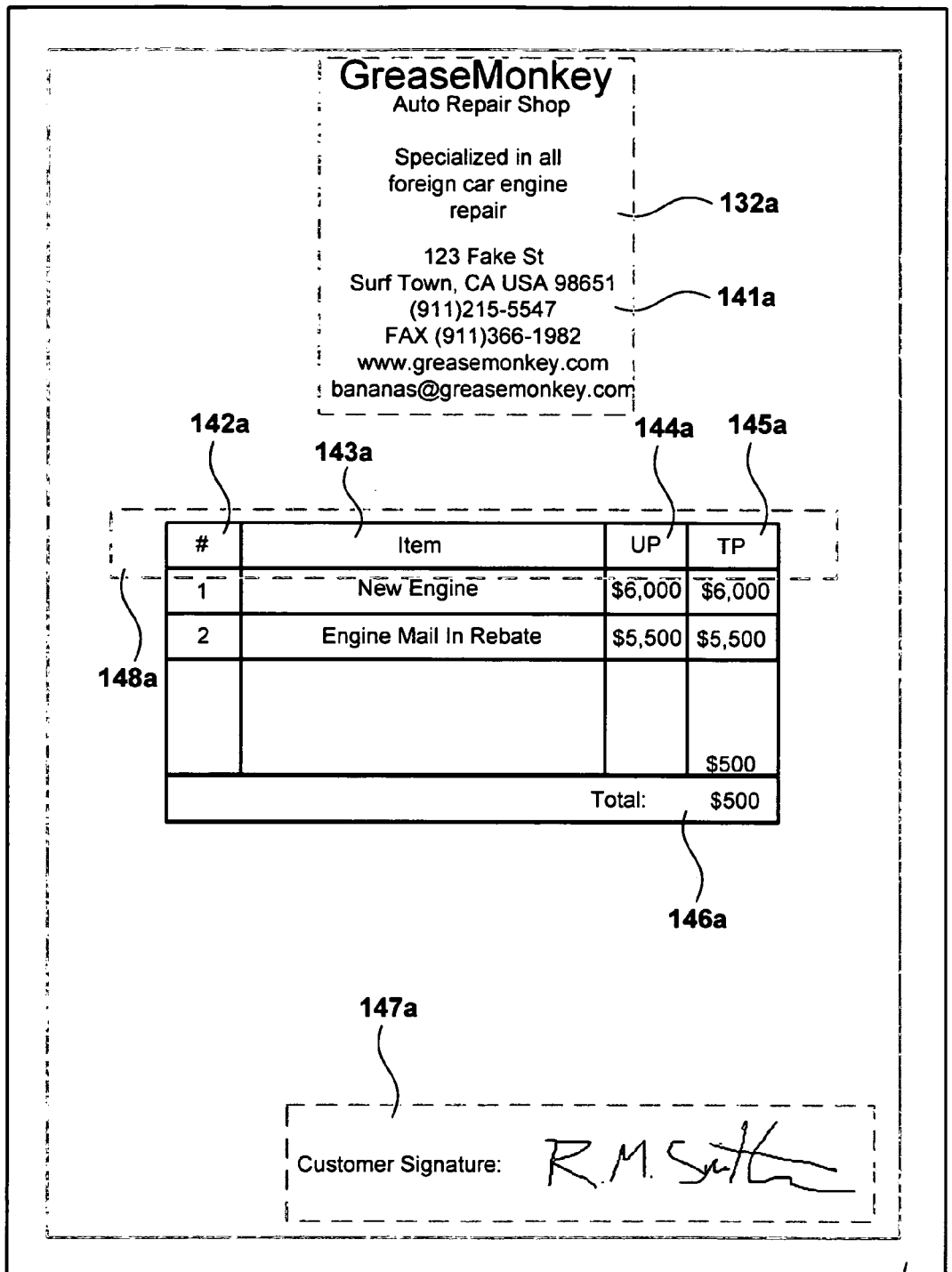

In another exemplary embodiment 140A, illustrated in FIG. 13A, a document format for an invoice document may be selected. A field structure may be defined with fields including, but not limited to, a quantity field 142A, an item description field 143A, a unit price field 144A, a total price field 145A, a grand total field 146A, and a customer signature field 147A, which may also include a digital signature field. Static content in this embodiment comprises a letterhead 141A.

Figure 14:
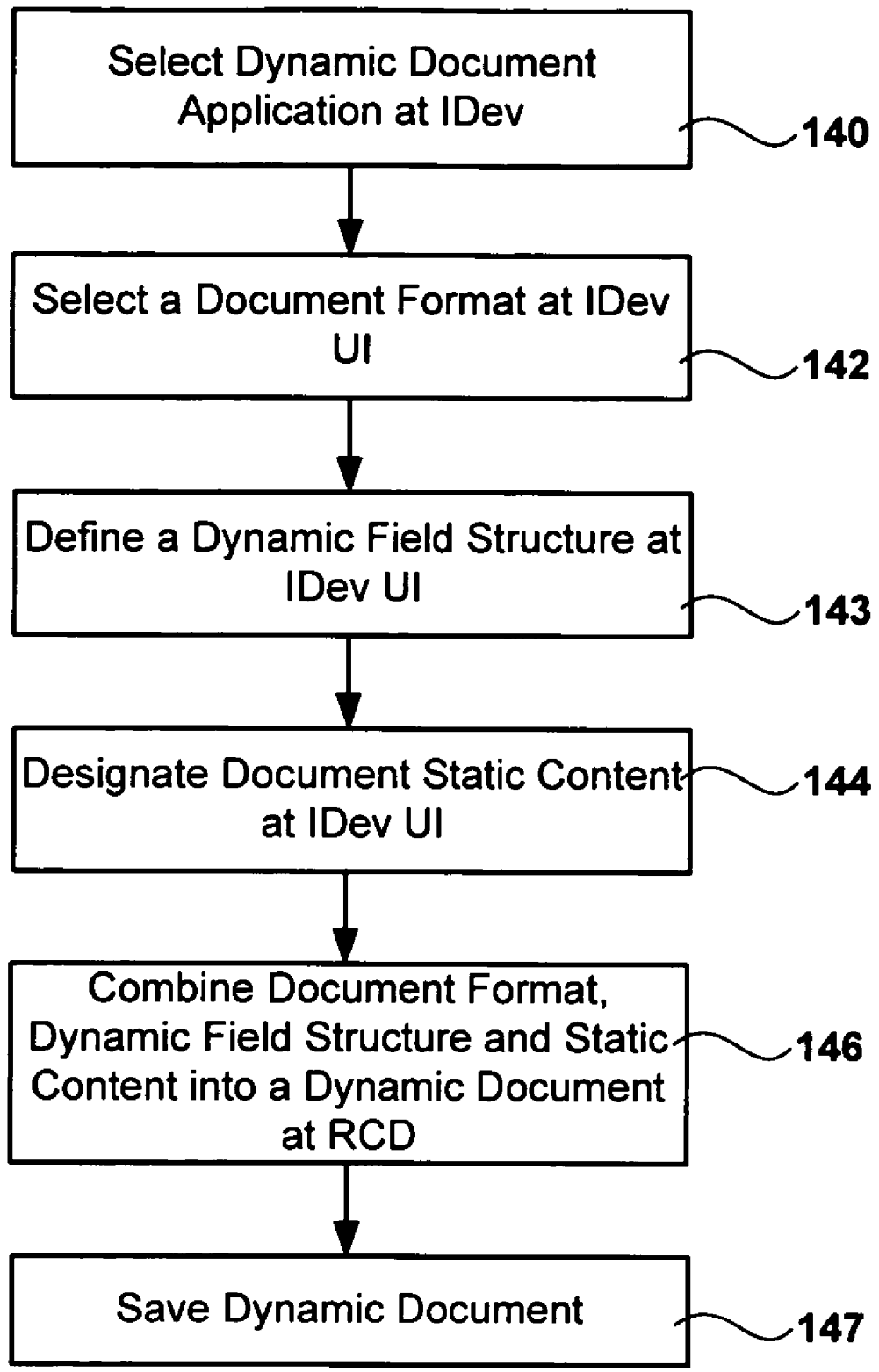
FIG. 14 is a chart showing steps of an embodiment comprising a form building application on a remote computing device.

In some embodiments of the present invention, as illustrated in FIG. 14, a user may select a dynamic document editor application 141. In these embodiments, a user may select 142 a document format, as described above. A document format definition may include data comprising page size, page orientation, single-sided pages, double-sided pages, margins, headers, footers, columns, predefined templates and other formatting options.

A user may also define 143 a dynamic field structure. This dynamic field structure may comprise one or more fields that may be populated with data. Fields may be populated with user input at the IDev UI 124. Fields may also be populated by automated processes that access information stored on the IDev, an RCD or some other resource in communication with the IDev. Some fields may be populated at the time of dynamic document creation. Fields may also be populated when a document is generated for output, such as for printing or transmission to a recipient. Fields may comprise many types of information. Some types comprise text, numerical data, graphics, images and other types.

A user may also designate 144 document static content. This static content may comprise text, graphics, images, symbols, numbers and other data that is intended to be communicated by each instance of the document. Document static content does not change with any document variable. Once these elements are defined, a combination of the document format, dynamic field structure and static content may be formed into a dynamic document. The application that combines these elements into a dynamic document may reside on the IDev or may reside on a remote computing device (RCD). The dynamic document may then be saved 147 at any location accessible to the IDev.

Figure 15:
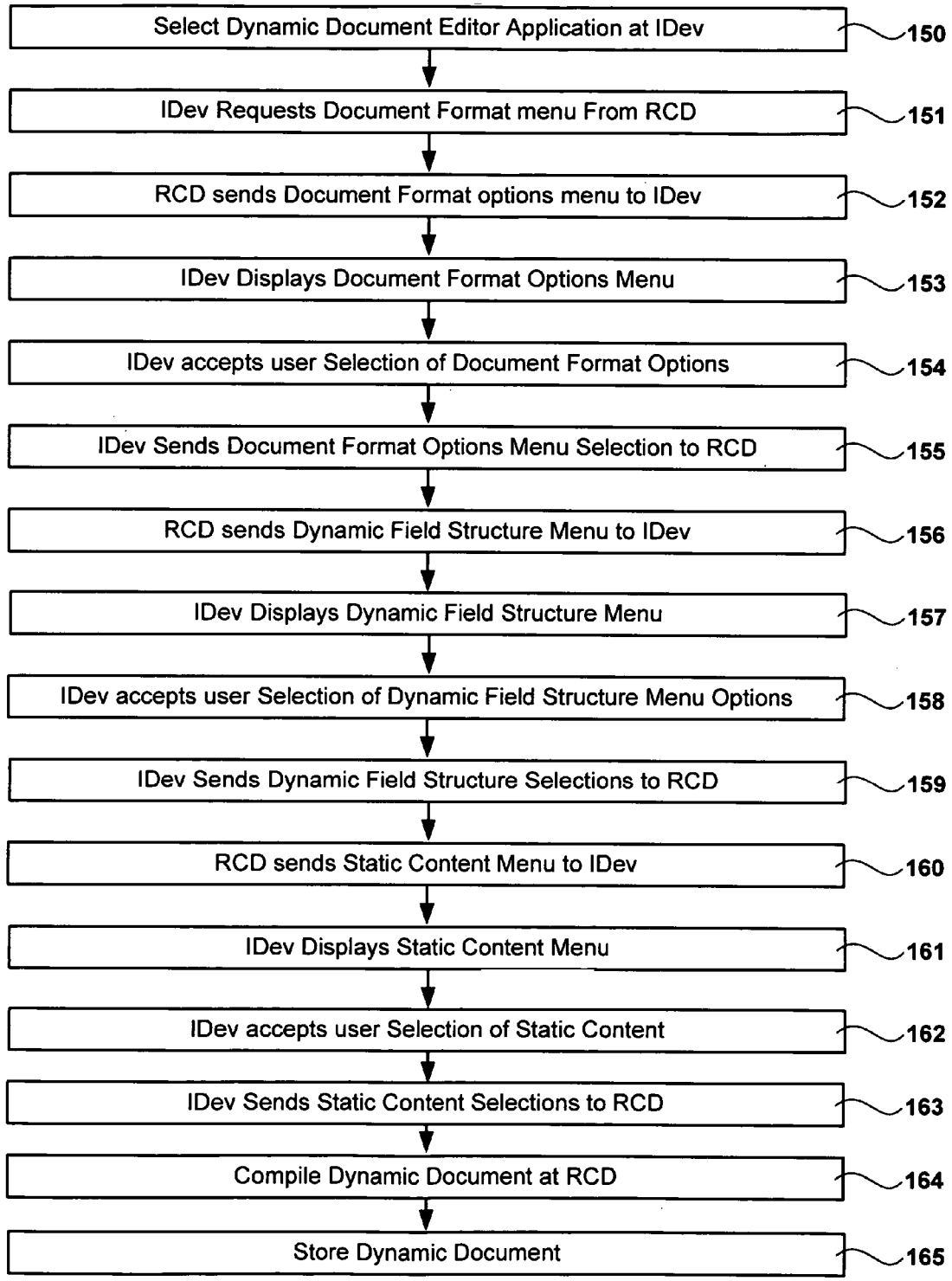
FIG. 15 is a chart showing steps of an embodiment comprising designating document format and content at an imaging device.

Further embodiments of the present invention may be described with reference to FIG. 15. These embodiments comprise selecting 150 a dynamic document editor application at an imaging device (IDev) 120. The IDev may respond to this selection 150 by requesting 151 a document format menu from a remote computing device (RCD) 128. The RCD may then send 152 a document format options menu to the IDev. In response to the display of the document format menu data, a user may input a selection at the IDev. The IDev may receive 154 this selection from its UI 124. This document format menu may be formatted as a hypertext language document, such as an XML document. The IDev may then display 153 the document format options menu. Menu display may be accomplished through the use of a web browser that interprets and displays content in a hypertext language format. The IDev may then send 155 the document format options menu selection to the RCD. This selection message may take the form of an XML/SOAP message or a .NET message.

In some embodiments of the present invention, the RCD may then send 156 a dynamic field structure menu to the IDev. This dynamic field structure menu may be formatted as a hypertext language document, such as an XML document. The IDev may then display 157 the dynamic field structure menu. This menu may be displayed through a web browser as described above in the document format menu. In response to this menu display, a user may input a selection through the IDev UI. The IDev may receive 158 this selection and then send 159 the dynamic field structure menu selection to the RCD.

In some embodiments, the RCD may respond to the receipt of the dynamic field structure menu selection data by sending 160 a static content menu to the IDev. The IDev may then display 161 the static content menu in a manner similar to that described for other embodiments. When a user responds, the IDev may accept 162 a user selection of the static content menu and send 163 the static content menu selection to the RCD.

The RCD may then compile 164 the document format, the dynamic field structure and the static content into a dynamic document. The dynamic document may then be saved 165 at the IDev, the RDC or some other location.

Some embodiments of the present invention comprise associating dynamic document editor application options with user specific data. In these embodiments, a user is identified through the IDev. Data linked to the user may then be accessed by the IDev or a device in communication with the IDev. This user-specific data may be linked or otherwise related to the document field structure. A document field may relate user-specific data that is stored on a resource accessible to the IDev or RCD. In some embodiments, a user's personal information may be related to fields in a dynamic document. A user's name, address, social security number, bank account data and/or other information may be related to dynamic document fields so that these fields are automatically populated with personal data when a user selects a defined dynamic document. Security measures may be implemented when a user logs onto the application.

Figure 16:
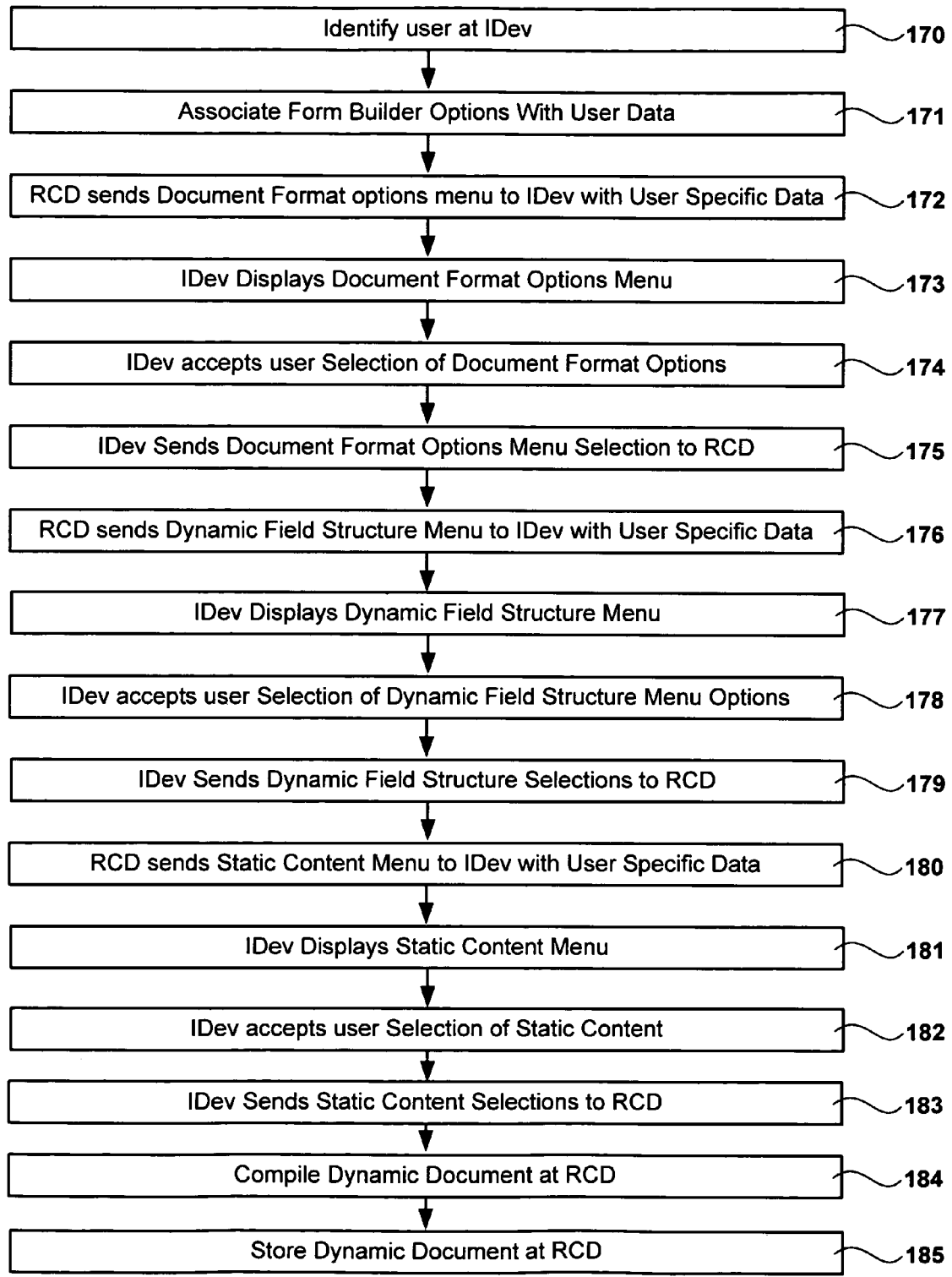
FIG. 16 is a chart showing steps of an embodiment comprising menus with user-specific data.

Some embodiments, illustrated in FIG. 16, comprise identifying 170 a user at an imaging device (IDev) 120 and associating 171 dynamic document editing options, such as menu selections, with the user. In these embodiments, a remote computing device (RCD) 128 may send 172 a document format options menu, which may comprise user-specific options, to the IDev which may then display 173 the document format options menu and accept 174 a user selection in relation to the menu. The IDev may then-send 175 the document format options menu selection to the RCD.

Some embodiments of the present invention may further comprise sending 176 a dynamic field structure menu, which may comprise user specific data, to the IDev from an RCD. The IDev may then display 177 the dynamic field structure menu and accept 178 a user selection of the menu. The IDev may then send 179 the dynamic field structure menu selection to the RCD.

Some embodiments of the present invention may further comprise sending 180 a static content menu, which may comprise user specific data, to the IDev from an RCD. The IDev may then display 181 the static content menu and accept 182 a user selection of the menu. The IDev may then send 183 the static content menu selection to the RCD. The RCD may then compile 184 a dynamic document comprising data from the document format menu selection, the field structure menu selection and the static content menu selection. The dynamic document may then be saved 185 at the RDC, the IDev or some other location.

Figure 17:
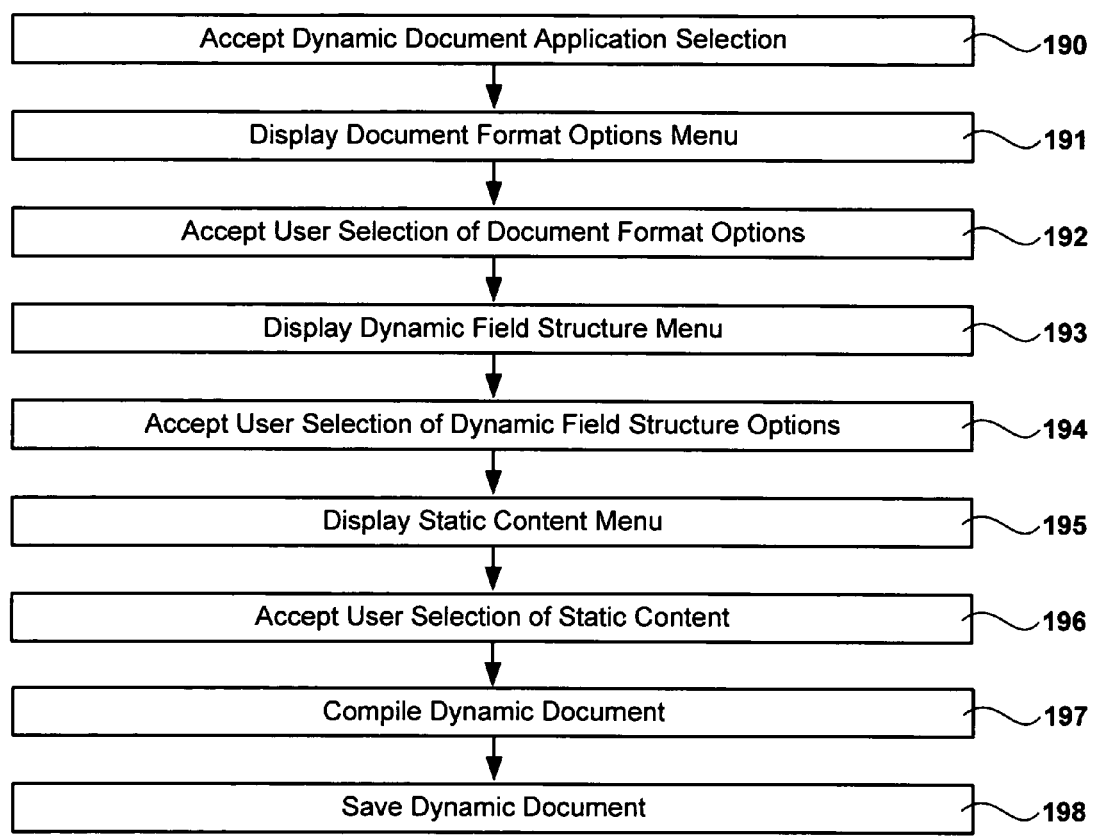
FIG. 17 is a chart showing steps of an embodiment comprising storing a dynamic document on a remote computing device.

Further embodiments of the present invention may be described with reference to FIG. 17. These embodiments comprise an IDev with applications and resources integral to the IDev. In these embodiments, an IDev takes steps to create a dynamic document. The IDev typically begins the process with the receipt of 190 a dynamic document editor application selection at an imaging device (IDev) 120 UI. The IDev may then display 191 a document format options menu and accept 192 a user selection of the document format options menu. The IDev may further display 193 a dynamic field structure menu and accept 194 a user selection of the dynamic field structure menu. The IDev may then display 195 a static content menu and accept 196 user selection of the static content menu. In some embodiments, these menus and selections may be combined into fewer divisions or split into more divisions for efficiency, convenience or for other reasons. The IDev may then compile 197 a dynamic document and save 198 the dynamic document.

Figure 18:
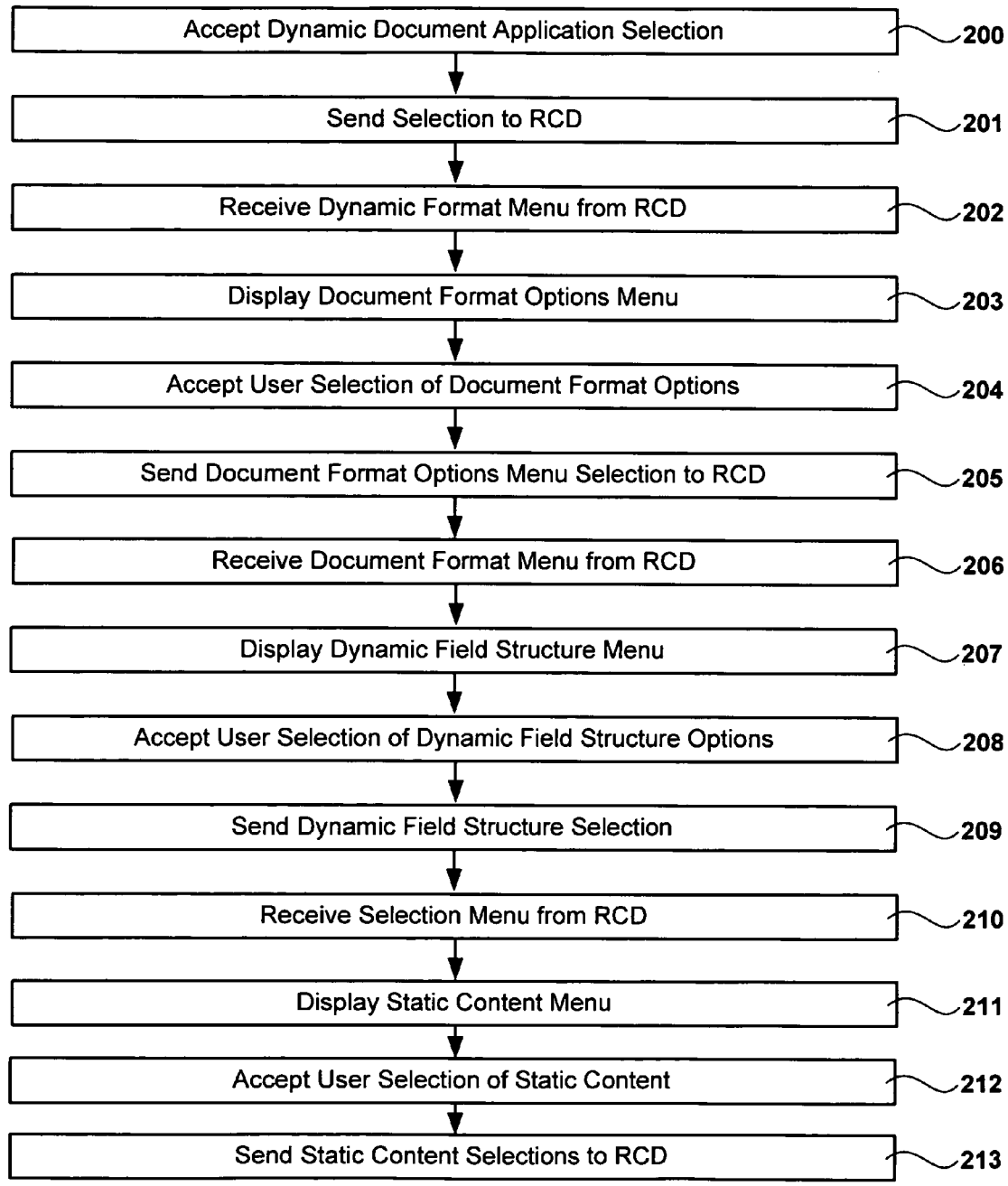
FIG. 18 is a chart showing steps of an embodiment comprising sending and displaying options menus at an imaging device.

Further embodiments of the present invention, as illustrated in FIG. 18, comprise an IDev at which user input may be received and at which menu content may be received from an RCD on which applications and resources may reside. In these embodiments, the IDev may accept 200 a dynamic document editor application selection. The IDev may then send 201 the dynamic document editor application selection to a remote computing device (RCD) 128, on which the dynamic document editor application may be executed. In response, the IDev may receive 202 a document format options menu from the RCD. The IDev may then display 203 the document format options menu and accept 204 any user selection in response to the document format options menu.

The IDev may then receive 206 a dynamic field structure menu from the RCD and may then display 207 the dynamic field structure menu. The IDev may then accept 208 a user selection in response to the dynamic field structure menu and send 209 the user selection to the RCD. The IDev may then receive 210 a static content menu from the RCD and may then display 211 the static content menu. The IDev may then accept 212 a user selection in response to the static content menu and send 213 the user selection to the RCD.

Figure 19:
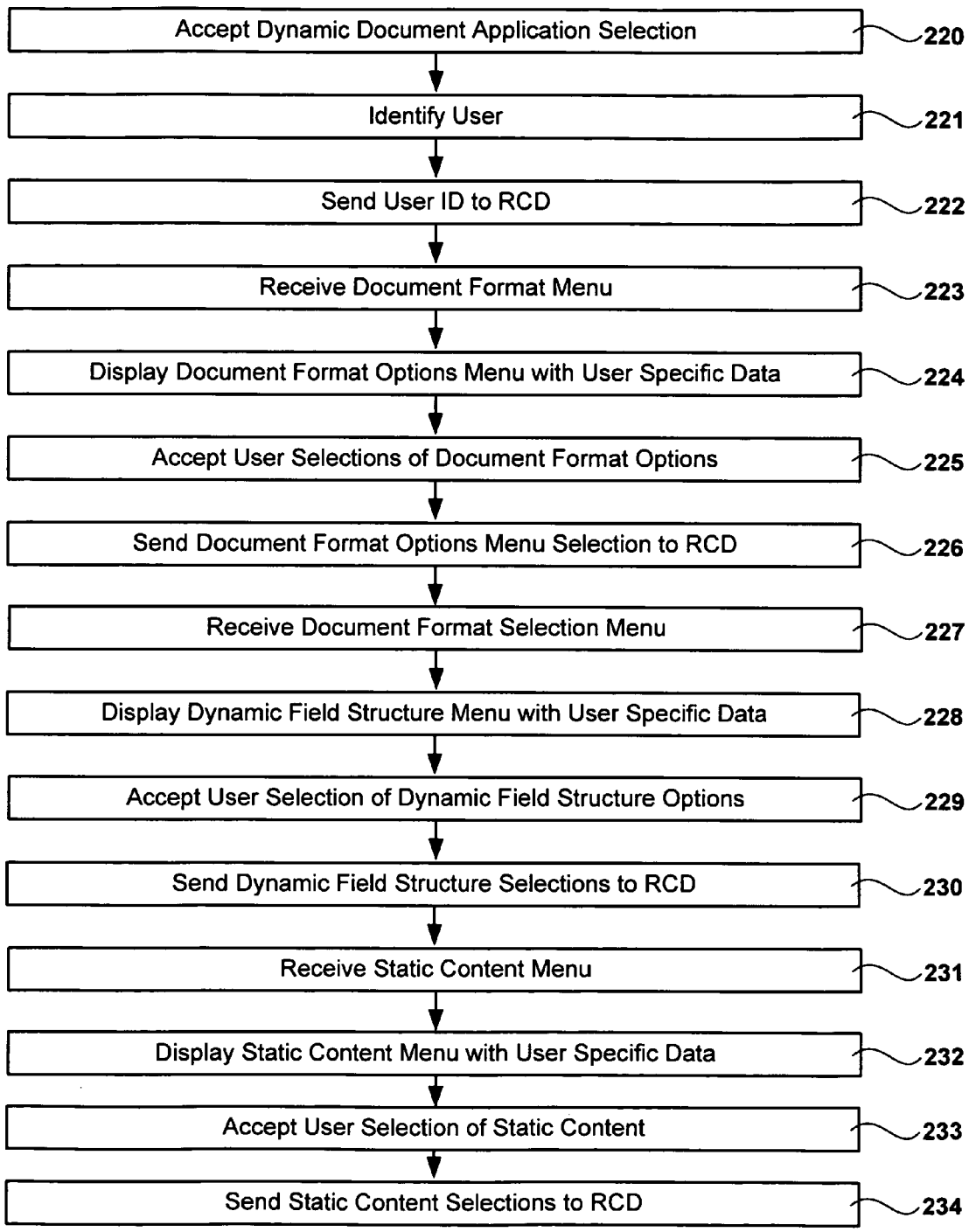
FIG. 19 is a chart showing steps of an embodiment comprising displaying user-specific options menus on an imaging device.

Further embodiments of the present invention may be described with reference to FIG. 19. These embodiments comprise an IDev that may receive user input and that may also receive menu content from an RCD. In these embodiments, the IDev may accept 220 a dynamic document editor application selection. The IDev may also identify 221 a user by receipt of credentials at the IDev UI or by some other method. The IDev may then send 222 the user identification data to a remote computing device (RCD) 128 along with a request to run the dynamic document editor application. The IDev may then receive 223 a document format options menu from the RCD. This menu may comprise user-specific data that is correlated to the user. User specific data may be stored on the RCD or another device in communication with the RCD. This menu may be displayed 224 on the IDev. The IDev may then accept 225 a user selection in response to the document format options menu and send 226 the user selection to the RCD.

The IDev may then receive 227 a dynamic field structure menu from the RCD. This menu may also comprise user specific data correlated to the identified user. The IDev may then display 228 the dynamic field structure menu. The IDev may then accept 229 a user selection in response to the dynamic field structure menu and send 230 the user selection to the RCD. The IDev may then receive 231 a static content menu from the RCD. Again, this menu may comprise user-specific data correlated to the identified user. The IDev may then display 232 the static content menu. The IDev may then accept 233 a user selection in response to the static content menu and send 234 the user selection to the RCD. The dynamic document editor application may then take this selection data transmitted from the IDev and compile a dynamic document.

Figure 20:
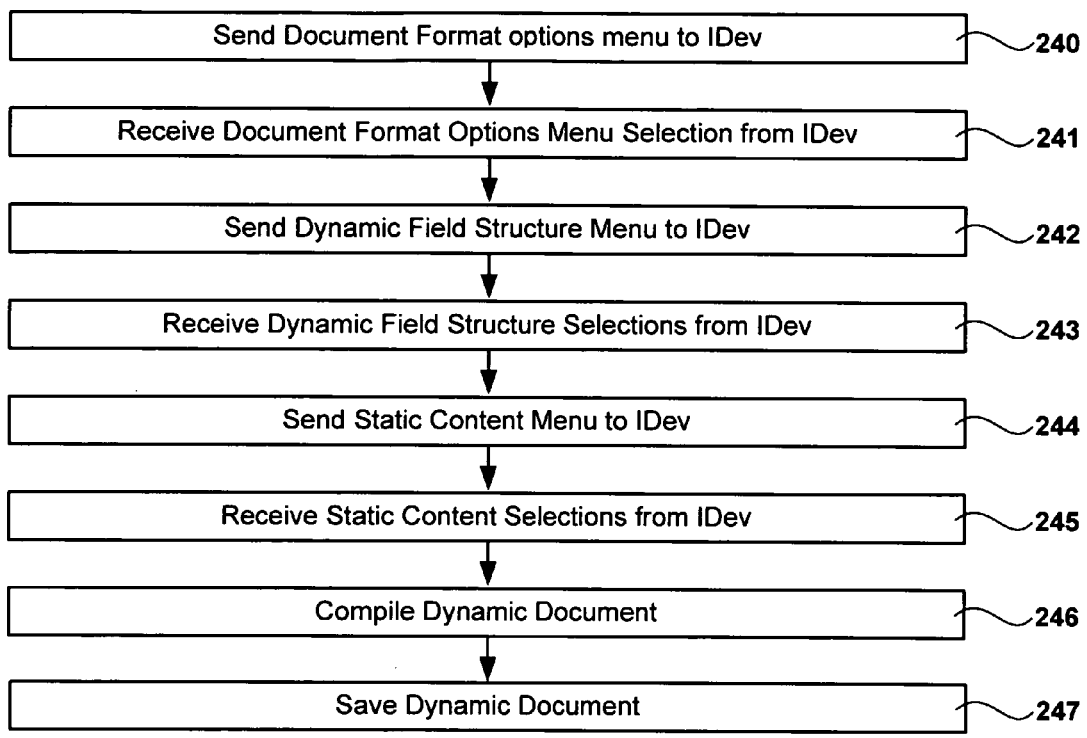
FIG. 20 is a chart showing steps of an embodiment comprising saving a dynamic document on a remote computing device.

Further embodiments of the present invention may be described with reference to FIG. 20. These embodiments comprise an RCD with a dynamic document editing application. In these embodiments, an RCD may send 240 a document format options menu to an imaging device (IDev) 120 and receive 241 a user selection of the document format options menu from the IDev. In these embodiments the RCD may also send 242 a dynamic field structure menu to the IDev and receive 243 a user selection of the dynamic field structure menu. The RCD may also send 244 a static content menu to the IDev and receive 245 a user selection of the static content menu. The RCD may then compile 246 the input that it has received into a dynamic document and save 247 the dynamic document.

Figure 21:
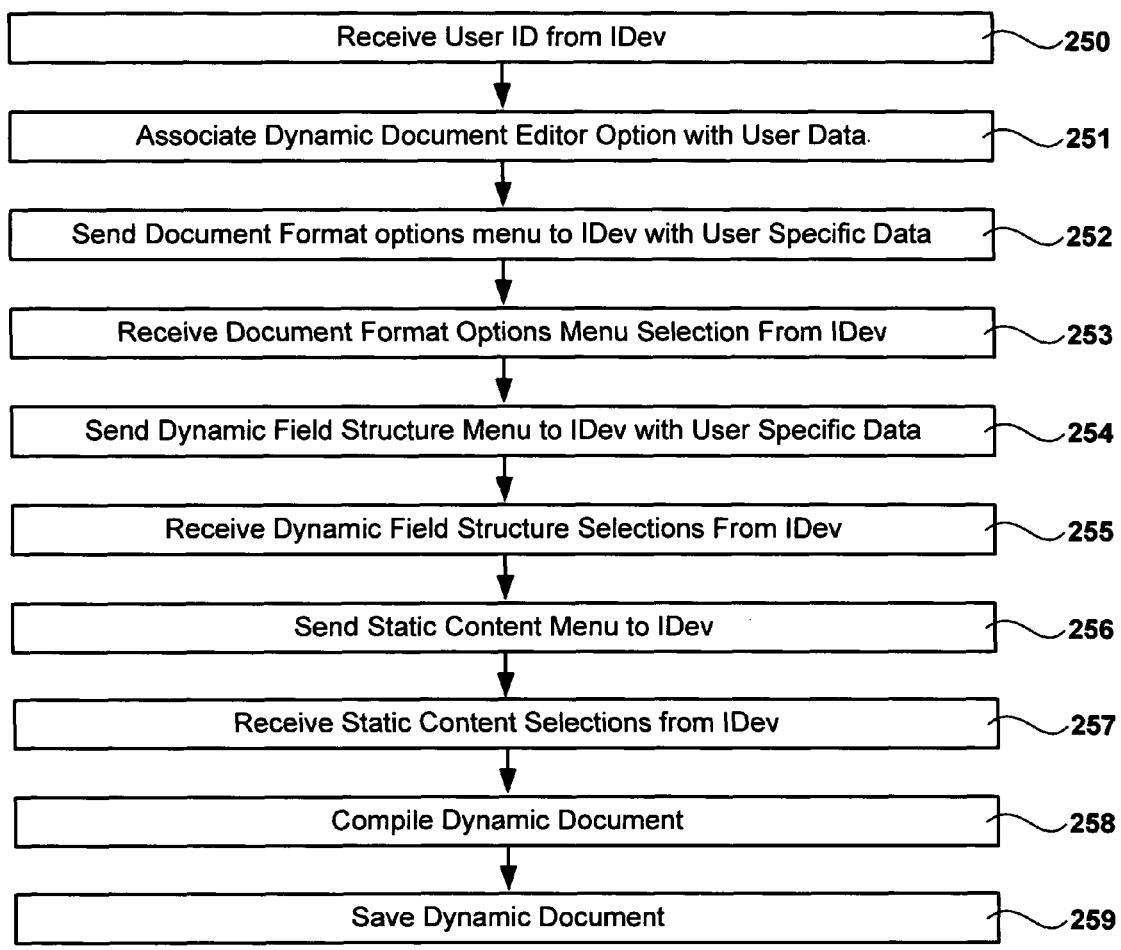
FIG. 21 is a chart showing steps of an embodiment comprising compiling user selections into a dynamic document on a remote computing device.
Figure 22:
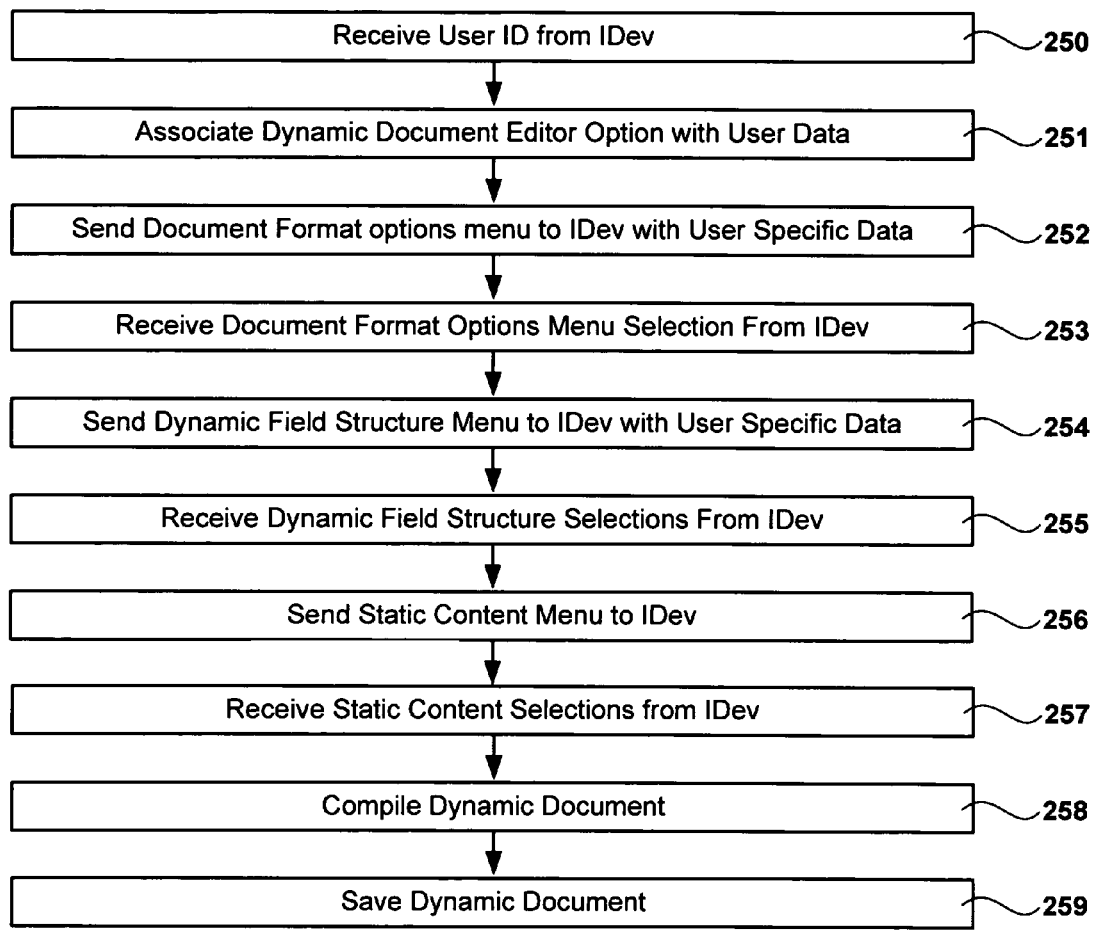
FIG. 22 is a chart showing steps of an embodiment comprising compiling user-specific menu selections into a dynamic document on a remote computing device.

Further embodiments of the present invention may be described with reference to FIG. 21. These embodiments comprise an RCD that may receive a user identification. These embodiments comprise receiving 250 a user identification data from an imaging device (IDev) 120 and associating 251 the user identification data with dynamic document editor application options. These embodiments may further comprise sending 252 a document format options menu (with user specific data) from a remote computing device (RCD) 128 to the (IDev) and receiving 253, from the IDev, a user selection in response to the document format options menu. The RCD may also send 254 a dynamic field structure menu to the IDev and receive 255 from the IDev a user selection in response to the dynamic field structure menu. Embodiments of the present invention may further comprise the RCD sending 256 a static content menu to the IDev and receiving 257 a user selection in response to the static content menu. The RCD may then compile 258 a dynamic document and save 259 the dynamic document.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for imaging device dynamic document creation and organization, the method comprising:
    identifying a user at an imaging device (IDev), based on user input at an IDev user interface (UI);
    sending a user identification, formatted as a markup language message, from a web service on said IDev to a remote computing device (RCD);
    receiving access to data related to said user via said RCD;
    associating dynamic document editing functions with said user data, wherein said user data is linked to user data fields identified in a dynamic field structure;
    receiving a document format selection from an imaging device (IDev) user interface (UI) on an IDev, wherein said document format selection defines a page size, a page orientation, a single-sided or double-sided page format, a margin parameter, a header parameter and a footer parameter and at least one of a text box parameter and a graphic box parameter, and wherein said IDev comprises a printer function and said IDev UI in a single hardware device;

defining a dynamic field structure on said imaging device (IDev) UI, wherein said dynamic field structure defines a plurality of data fields comprising numerical data, graphics data, and image data, wherein said dynamic field structure defines field attributes consisting of field size, field shape, field color, field background color, field shading, field rotation and field orientation, said dynamic field structure also comprising a field relationship relating content of a first field in said plurality of data fields to content of a second field in said plurality of data fields, wherein said field relationship defines a plurality of relationships consisting of a geographical relationship, a mathematical relationship and a logical relationship wherein said content of said first field is related to said content of said second field according to said relationships;

designating document static content on said imaging device (IDev) user interface, wherein said document static content defines content remaining constant in all instances of said dynamic document; and compiling said document format, said dynamic field structure and said document static content into a dynamic document on said IDev, wherein said dynamic document is a selectable file, which, when selected, automatically populates said data fields to create a document defined by said document format, said dynamic field structure and said document static content.

2. A method as described in claim 1 wherein said combining into a dynamic document is done on a remote computing device (RCD).

3. A method for imaging device dynamic document creation and organization, said method comprising:

receiving a user identification, formatted as a markup language message, from a web service on an imaging device (IDev) to a remote computing device (RCD);

accessing data related to said user with said RCD;

associating dynamic document editing functions with said user data, wherein said user data is linked to user data fields identified in a dynamic field structure;

receiving a dynamic document editing request as a markup language message received from said web service on said imaging device (IDev) at said remote computing device (RCD);

sending document format options menu content to said IDev web service from said RCD, wherein said document format options menu content is an XML message;

receiving a document format options menu selection from said IDev web service at said RCD, wherein said document format options menu selection defines a page size, a page orientation, a single-sided or double-sided page format, a margin location, a header dimension or a footer dimension and at least one of a text box parameter and a graphics box parameter and wherein said document format options menu selection is a markup language message;

sending a dynamic field structure options menu to said IDev, wherein said dynamic field structure options menu is in the form of a markup language message;

receiving a dynamic field structure options selection from said IDev, wherein said dynamic field structure options selection was received as user input on an IDev user interface (UI) at said IDev and wherein said dynamic field structure options selection defines a plurality of data fields comprising numerical data, graphics data and image data, wherein said dynamic field structure also defines field attributes consisting of field size, field shape, field color, field background color, field shading, field rotation and field orientation, said dynamic field structure also comprising a field relationship relating content of a first field in said plurality of data fields to content of a second field in said plurality of data fields, wherein said field relationship defines a plurality of relationships consisting of a geographical relationship, a mathematical relationship and a logical relationship wherein said content of said first field is related to said content of said second field according to said relationships;

sending a static content menu to said IDev from said RCD, wherein said static content menu is in the form of a markup language message;

receiving a static content menu selection from said IDev web service as a markup language message , wherein said static content menu selection defines content remaining constant in all documents created with said dynamic document;

compiling said document format options menu selection, said dynamic field structure options menu selection and said static content menu selection into a dynamic document on said RCD and wherein said dynamic document is a selectable file, which, when selected, automatically populates said data fields to create a document defined by said document format, said dynamic field structure and said document static content.

4. A method as described in claim 3 further comprising storing said dynamic document in a manner that provides access to any sources linked to a field in said dynamic document.

5. A method for imaging device dynamic document creation and organization, said method comprising:

identifying a user at an imaging device (IDev), based on user input at an IDev user interface (UI);

sending a user identification, formatted as a markup language message, from a web service on said IDev to a remote computing device (RCD);

accessing data related to said user with said RCD;

associating dynamic document editing functions with said user data, wherein said user data is linked to user data fields identified in a dynamic field structure;

sending a document format options menu with user specific data to said IDev from said remote computing device (RCD), wherein said document format options menu is a markup language message;

displaying said document format options menu on said IDev;

accepting a document format user selection of said document format options on said IDev, wherein said document format user selection defines at least one of a page size, a page orientation, a single-sided or double-sided page format, a margin location, a header dimension or a footer dimension and at least one of a text box parameter and a graphic box parameter;

sending said user selection to said RCD;

sending a dynamic field structure options menu with user specific data to said IDev from said RCD;

displaying said dynamic field structure options menu on said IDev;

accepting a dynamic field structure user selection of said dynamic field structure options on said IDev, wherein said dynamic field structure user selection defines a plurality of data fields comprising numerical data, graphics data and image data, wherein said dynamic field structure also defines field attributes consisting of field size, field shape, field color, field background color, field shading, field rotation and field orientation, said dynamic field structure also comprising a field relationship relating content of a first field in said plurality of data fields to content of another field in said plurality of data fields, wherein said field relationship defines a plurality of relationships consisting of a geographical relationship, a mathematical relationship and a logical relationship;

sending said user selection to said RCD;

sending a static content menu with user specific data to said IDev from said RCD;

displaying said static content menu on said IDev;

accepting a static content user selection of said static content menu on said IDev, wherein said static content user selection defines content remaining constant in all documents created with said dynamic document;

sending said user selection to said RCD; and compiling said document format user selection, said dynamic field structure user selection and said static content user selection into a dynamic document on said RCD, wherein said dynamic document is a selectable file, which, when selected, automatically populates said data fields to create a document defined by said document format user selection, said dynamic field structure user selection and said document static content user selection if said selectable file is selected by an entity authenticated as said user.

6. A method as described in claim 5 wherein said dynamic field structure options comprise at least one option selected from the set consisting of relating a field to data stored on a remote device, relating a field to data on a web page and relating a field to user-specific data stored on a user database.

7. A method as described in claim 5 wherein said static content comprises at least one item selected from the set consisting of text, numerical data, graphical data, and images.

8. A non-transitory, computer-readable medium comprising instructions for instructing a processor to execute a method for imaging device dynamic document creation and organization, said instructions instructing said processor to:

identify a user at an imaging device (IDev), based on user input at an IDev user interface (UI);

send a user identification, formatted as a markup language message, from a web service on said IDev to a remote computing device (RCD);

receive access to data related to said user via said RCD;

associate dynamic document editing functions with said user data, wherein said user data is linked to user data fields identified in a dynamic field structure;

receive a document format selection from an imaging device (IDev) user interface (UI) on an IDev, wherein said document format selection defines a page size, a page orientation, a single-sided or double-sided page format, a margin parameter, a header parameter and a footer parameter and at least one of a text box parameter and a graphic box parameter, and wherein said IDev comprises a printer function and said IDev UI in a single hardware device;

define a dynamic field structure on said imaging device (IDev) UI, wherein said dynamic field structure defines a plurality of data fields comprising numerical data, graphics data, and image data, wherein said dynamic field structure defines field attributes consisting of field size, field shape, field color, field background color, field shading, field rotation and field orientation, said dynamic field structure also comprising a field relationship relating content of a first field in said plurality of data fields to content of a second field in said plurality of data fields, wherein said field relationship defines a plurality of relationships consisting of a geographical relationship, a mathematical relationship and a logical relationship wherein said content of said first field is related to said content of said second field according to said relationships;

designate document static content on said imaging device (IDev) user interface, wherein said document static content defines content remaining constant in all instances of said dynamic document; and compile said document format, said dynamic field structure and said document static content into a dynamic document on said IDev, wherein said dynamic document is a selectable file, which, when selected, automatically populates said data fields to create a document defined by said document format, said dynamic field structure and said document static content.

9. A non-transitory, computer-readable medium comprising instructions for instructing a processor to execute a method for imaging device dynamic document creation and organization, said instructions instructing said processor to:

receive a user identification, formatted as a markup language message, from a web service on an imaging device (IDev) to a remote computing device (RCD);

access data related to said user with said RCD;

associate dynamic document editing functions with said user data, wherein said user data is linked to user data fields identified in a dynamic field structure;

receive a dynamic document editing request as a markup language message received from said web service on said imaging device (IDev) at said remote computing device (RCD);

send document format options menu content to said IDev web service from said RCD, wherein said document format options menu content is an XML message;

receive a document format options menu selection from said IDev web service at said RCD, wherein said document format options menu selection defines a page size, a page orientation, a single-sided or double-sided page format, a margin location, a header dimension or a footer dimension and at least one of a text box parameter and a graphics box parameter and wherein said document format options menu selection is a markup language message;

send a dynamic field structure options menu to said IDev, wherein said dynamic field structure options menu is in the form of a markup language message;

receive a dynamic field structure options selection from said IDev, wherein said dynamic field structure options selection was received as user input on an IDev user interface (UI) at said IDev and wherein said dynamic field structure options selection defines a plurality of data fields comprising numerical data, graphics data and image data, wherein said dynamic field structure also defines field attributes consisting of field size, field shape, field color, field background color, field shading, field rotation and field orientation, said dynamic field structure also comprising a field relationship relating content of a first field in said plurality of data fields to content of a second field in said plurality of data fields, wherein said field relationship defines a plurality of relationships consisting of a geographical relationship, a mathematical relationship and a logical relationship wherein said content of said first field is related to said content of said second field according to said relationships;

send a static content menu to said IDev from said RCD, wherein said static content menu is in the form of a markup language message;

receive a static content menu selection from said IDev web service as a markup language message, wherein said static content menu selection defines content remaining constant in all documents created with said dynamic document; and compile said document format options menu selection, said dynamic field structure options menu selection and said static content menu selection into a dynamic document on said RCD and wherein said dynamic document is a selectable file, which, when selected, automatically populates said data fields to create a document defined by said document format, said dynamic field structure and said document static content.

10. A non-transitory, computer-readable medium comprising instructions for instructing a processor to execute a method for imaging device dynamic document creation and organization, said instructions instructing said processor to:

identify a user at an imaging device (IDev), based on user input at an IDev user interface (UI);

send a user identification, formatted as a markup language message, from a web service on said IDev to a remote computing device (RCD);

access data related to said user with said RCD;

associate dynamic document editing functions with said user data, wherein said user data is linked to user data fields identified in a dynamic field structure;

send a document format options menu with user specific data to said IDev from said remote computing device (RCD), wherein said document format options menu is a markup language message;

display said document format options menu on said IDev;

accept a document format user selection of said document format options on said IDev, wherein said document format user selection defines at least one of a page size, a page orientation, a single-sided or double-sided page format, a margin location, a header dimension or a footer dimension and at least one of a text box parameter and a graphic box parameter;

send said user selection to said RCD;

send a dynamic field structure options menu with user specific data to said IDev from said RCD;

display said dynamic field structure options menu on said IDev;

accept a dynamic field structure user selection of said dynamic field structure options on said IDev, wherein said dynamic field structure user selection defines a plurality of data fields comprising numerical data, graphics data and image data, wherein said dynamic field structure also defines field attributes consisting of field size, field shape, field color, field background color, field shading, field rotation and field orientation, said dynamic field structure also comprising a field relationship relating content of a first field in said plurality of data fields to content of another field in said plurality of data fields, wherein said field relationship defines a plurality of relationships consisting of a geographical relationship, a mathematical relationship and a logical relationship;

send said user selection to said RCD;

send a static content menu with user specific data to said IDev from said RCD;

display said static content menu on said IDev;

accept a static content user selection of said static content menu on said IDev, wherein said static content user selection defines content remaining constant in all documents created with said dynamic document;

send said user selection to said RCD; and compile said document format user selection, said dynamic field structure user selection and said static content user selection into a dynamic document on said RCD, wherein said dynamic document is a selectable file, which, when selected, automatically populates said data fields to create a document defined by said document format user selection, said dynamic field structure user selection and said document static content user selection if said selectable file is selected by an entity authenticated as said user.

* * * * *